US012671640B2

(12) United States Patent
Revanuru

(10) Patent No.: US 12,671,640 B2
(45) Date of Patent: Jun. 30, 2026

(54) SYSTEM AND METHOD FOR PROVIDING A CLOUD COMPUTING ENVIRONMENT

(71) Applicant: ORACLE INTERNATIONAL CORPORATION, Redwood Shores, CA (US)

(72) Inventor: Naresh Revanuru, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/968,187

(22) Filed: Oct. 18, 2022

(65) Prior Publication Data

US 2023/0037542 A1 Feb. 9, 2023

Related U.S. Application Data

(63) Continuation of application No. 16/265,107, filed on Feb. 1, 2019, now Pat. No. 11,502,921, which is a continuation of application No. 14/021,965, filed on Sep. 9, 2013, now Pat. No. 10,225,164.

(60) Provisional application No. 61/799,465, filed on Mar. 15, 2013, provisional application No. 61/698,454, filed on Sep. 7, 2012, provisional application No. 61/698,335, filed on Sep. 7, 2012, provisional application No. 61/698,473, filed on Sep. 7, 2012, provisional application No. 61/698,330, filed on Sep. 7, 2012, provisional application No. 61/698,321, filed on Sep. 7, 2012, provisional application No. 61/698,325, filed on Sep. 7, 2012, provisional application No. 61/698,317, filed on Sep. 7, 2012.

(51) Int. Cl.
*H04L 43/04* (2022.01)
*H04L 41/5041* (2022.01)

(52) U.S. Cl.
CPC .......... *H04L 43/04* (2013.01); *H04L 41/5041* (2013.01)

(58) Field of Classification Search
CPC .......... G06F 9/45533; G06F 8/60; G06F 8/61; G06F 2009/45562; H04L 41/40; H04L 41/5041; H04L 43/04
See application file for complete search history.

(56) References Cited

U.S. PATENT DOCUMENTS

| | | | |
|---|---|---|---|
| 7,734,583 B2 | 6/2010 | Vitanov | |
| 7,886,021 B2 | 2/2011 | Scheifler | |
| 7,886,038 B2 | 2/2011 | Ferris | |
| 7,984,119 B2 | 7/2011 | Pham | |
| 8,184,641 B2 | 5/2012 | Alt | |
| 8,281,307 B2 | 10/2012 | Arnold | |
| 8,291,490 B1 * | 10/2012 | Ahmed | G06F 21/604 726/20 |

(Continued)

OTHER PUBLICATIONS

Oracle, "Accelerating Enterprise Cloud Infrastructure Deployments", © 2011, 4 pages.

(Continued)

*Primary Examiner* — Shean Tokuta
(74) *Attorney, Agent, or Firm* — TUCKER ELLIS LLP

(57) ABSTRACT

A system and method for enabling a cloud computing environment. In accordance with an embodiment, the system can include a variety of hardware and/or software components and features, which can be used in delivering an infrastructure, platform, and/or applications to support public and private clouds.

20 Claims, 14 Drawing Sheets

(56) References Cited

U.S. PATENT DOCUMENTS

| | | | |
|---|---|---|---|
| 8,331,250 B2 | 12/2012 | Middleton-Hand | |
| 8,347,310 B1* | 1/2013 | Vanderspek | G06F 8/447 |
| | | | 719/310 |
| 8,413,142 B2 | 4/2013 | Sharp | |
| 8,424,059 B2 | 4/2013 | Kwok | |
| 8,429,203 B2 | 4/2013 | Perez | |
| 8,434,080 B2 | 4/2013 | Yendluri | |
| 8,473,515 B2 | 6/2013 | Cotner | |
| 8,533,161 B2 | 9/2013 | McDonald | |
| 8,572,587 B2 | 10/2013 | Dehaan | |
| 8,589,481 B2 | 11/2013 | Das | |
| 8,601,467 B2 | 12/2013 | Hofhansl | |
| 8,645,837 B2* | 2/2014 | Little | G06F 8/61 |
| | | | 717/177 |
| 8,739,169 B2 | 5/2014 | Bonilla | |
| 8,769,622 B2 | 7/2014 | Chang | |
| 8,769,704 B2 | 7/2014 | Peddada | |
| 8,775,626 B2 | 7/2014 | Teather | |
| 8,793,684 B2 | 7/2014 | Breitgand | |
| 8,813,065 B2 | 8/2014 | Zygmuntowicz | |
| 8,839,042 B2 | 9/2014 | Bromley | |
| 8,839,249 B2 | 9/2014 | Mills | |
| 8,880,558 B2 | 11/2014 | Deng | |
| 8,893,141 B2 | 11/2014 | Bernabeu-Auban | |
| 8,903,884 B2 | 12/2014 | Vasters | |
| 8,904,382 B2 | 12/2014 | Berg | |
| 8,918,448 B2 | 12/2014 | DeLuca | |
| 8,924,791 B2 | 12/2014 | Gao | |
| 8,949,939 B2 | 2/2015 | Peddada | |
| 8,984,610 B2 | 3/2015 | Spiers | |
| 9,032,312 B2 | 5/2015 | Barnes | |
| 9,038,062 B2 | 5/2015 | Fitzgerald | |
| 9,047,133 B2* | 6/2015 | Winterfeldt | G06F 9/5066 |
| 9,052,961 B2 | 6/2015 | Mangtani | |
| 9,058,174 B2 | 6/2015 | Desai | |
| 9,058,213 B2 | 6/2015 | Yaffe | |
| 9,069,438 B2* | 6/2015 | Sharp | G06F 9/45558 |
| 9,170,798 B2 | 10/2015 | Nagaraja | |
| 9,229,710 B2 | 1/2016 | Arasaratnam | |
| 9,235,442 B2 | 1/2016 | Kampas | |
| 9,244,951 B2 | 1/2016 | Mandelstein | |
| 9,251,033 B2 | 2/2016 | Kirchhofer | |
| 9,262,193 B2* | 2/2016 | Hicks | G06F 9/45537 |
| 9,268,589 B2 | 2/2016 | Arcilla | |
| 9,280,335 B2 | 3/2016 | Adi | |
| 9,292,275 B2* | 3/2016 | Bowen | H04L 67/02 |
| 9,342,353 B2 | 5/2016 | Cherel | |
| 9,516,121 B2 | 12/2016 | Byrd Vallieres de St Real | |
| 9,560,036 B2 | 1/2017 | Hinton | |
| 9,589,002 B2 | 3/2017 | Rogers | |
| 9,613,092 B2 | 4/2017 | Agrawal | |
| 9,690,566 B2 | 6/2017 | Vinograd | |
| 9,690,607 B2 | 6/2017 | Richards | |
| 9,720,668 B2 | 8/2017 | McGrath | |
| 10,225,164 B2* | 3/2019 | Revanuru | H04L 41/40 |
| 10,860,384 B2 | 12/2020 | Wang | |
| 11,502,921 B2 | 11/2022 | Revanuru | |
| 2004/0198386 A1* | 10/2004 | Dupray | G01S 5/02 |
| | | | 455/456.1 |
| 2005/0060360 A1* | 3/2005 | Doyle | H04L 47/70 |
| | | | 709/200 |
| 2005/0166180 A1* | 7/2005 | Lemon | G06F 8/34 |
| | | | 717/109 |
| 2006/0242626 A1* | 10/2006 | Pham | G06F 8/61 |
| | | | 717/121 |
| 2007/0019622 A1* | 1/2007 | Alt | H04L 61/2564 |
| | | | 370/352 |
| 2007/0156650 A1* | 7/2007 | Becker | G06F 16/958 |
| 2007/0244926 A1* | 10/2007 | Vitanov | G06F 9/451 |
| 2008/0134175 A1* | 6/2008 | Fitzgerald | G06F 9/45533 |
| | | | 718/1 |
| 2008/0201701 A1* | 8/2008 | Hofhansl | G06F 8/60 |
| | | | 717/168 |
| 2009/0193426 A1* | 7/2009 | Bernabeu-Auban | G06F 9/5072 |
| | | | 718/104 |
| 2009/0234903 A1* | 9/2009 | Lomelli | G06F 9/5055 |
| | | | 709/201 |
| 2009/0249440 A1* | 10/2009 | Platt | H04L 63/0815 |
| | | | 726/1 |
| 2009/0271472 A1* | 10/2009 | Scheifler | H04L 41/0896 |
| | | | 709/202 |
| 2009/0300152 A1* | 12/2009 | Ferris | G06F 9/5072 |
| | | | 709/223 |
| 2010/0005443 A1* | 1/2010 | Kwok | G06Q 10/10 |
| | | | 717/100 |
| 2010/0014441 A1* | 1/2010 | Middleton-Hand | G06Q 10/06 |
| | | | 370/254 |
| 2010/0077449 A1* | 3/2010 | Kwok | G06F 9/5027 |
| | | | 718/104 |
| 2010/0131854 A1* | 5/2010 | Little | H04L 67/75 |
| | | | 715/735 |
| 2010/0153865 A1* | 6/2010 | Barnes | H04L 67/10 |
| | | | 715/762 |
| 2010/0161648 A1* | 6/2010 | Eberlein | G06F 16/24573 |
| | | | 707/769 |
| 2010/0223610 A1* | 9/2010 | Dehaan | G06F 8/63 |
| | | | 718/1 |
| 2010/0306772 A1* | 12/2010 | Arnold | G06F 8/36 |
| | | | 718/1 |
| 2011/0029970 A1* | 2/2011 | Arasaratnam | G06F 9/45558 |
| | | | 718/1 |
| 2011/0106771 A1* | 5/2011 | McDonald | G06F 16/182 |
| | | | 707/663 |
| 2011/0154441 A1* | 6/2011 | Oh | G06F 21/10 |
| | | | 726/3 |
| 2011/0246984 A1* | 10/2011 | Sharp | G06F 3/0632 |
| | | | 718/1 |
| 2011/0258620 A1* | 10/2011 | Gao | G06Q 10/06 |
| | | | 717/178 |
| 2011/0258634 A1* | 10/2011 | Bonilla | G06F 9/505 |
| | | | 709/224 |
| 2011/0271278 A1* | 11/2011 | Dittrich | G06F 9/45558 |
| | | | 718/1 |
| 2011/0276584 A1* | 11/2011 | Cotner | G06F 16/256 |
| | | | 707/769 |
| 2011/0314466 A1* | 12/2011 | Berg | G06F 9/5072 |
| | | | 718/1 |
| 2012/0005236 A1* | 1/2012 | Deng | G06F 8/10 |
| | | | 707/E17.011 |
| 2012/0005597 A1* | 1/2012 | Eberlein | G06F 9/4881 |
| | | | 718/102 |
| 2012/0011518 A1* | 1/2012 | Duan | G06F 9/505 |
| | | | 718/104 |
| 2012/0011578 A1* | 1/2012 | Hinton | H04L 63/0815 |
| | | | 726/8 |
| 2012/0030672 A1* | 2/2012 | Zygmuntowicz | G06F 9/45558 |
| | | | 718/1 |
| 2012/0047130 A1* | 2/2012 | Perez | G06Q 10/00 |
| | | | 707/723 |
| 2012/0054551 A1* | 3/2012 | Gao | G06F 11/3698 |
| | | | 714/38.1 |
| 2012/0066755 A1* | 3/2012 | Peddada | H04L 63/102 |
| | | | 726/8 |
| 2012/0072597 A1* | 3/2012 | Teather | G06F 9/5072 |
| | | | 709/226 |
| 2012/0084769 A1* | 4/2012 | Adi | G06F 8/63 |
| | | | 717/174 |
| 2012/0096429 A1* | 4/2012 | Desai | G06F 8/34 |
| | | | 717/107 |
| 2012/0096521 A1* | 4/2012 | Peddada | H04L 41/28 |
| | | | 726/4 |
| 2012/0102486 A1* | 4/2012 | Yendluri | G06F 9/5072 |
| | | | 717/176 |
| 2012/0102506 A1* | 4/2012 | Hopmann | G06F 9/5072 |
| | | | 718/102 |
| 2012/0110566 A1* | 5/2012 | Park | G06F 9/4451 |
| | | | 717/174 |

(56) References Cited

U.S. PATENT DOCUMENTS

| | | | | | |
|---|---|---|---|---|---|
| 2012/0124211 | A1* | 5/2012 | Kampas | H04L 47/80 | 709/226 |
| 2012/0159483 | A1* | 6/2012 | He | H04L 67/12 | 718/1 |
| 2012/0173513 | A1* | 7/2012 | Agrawal | G06F 16/24545 | 707/716 |
| 2012/0192187 | A1* | 7/2012 | Mills | G06Q 10/06 | 718/101 |
| 2012/0204219 | A1* | 8/2012 | Kopti | G06F 21/56 | 726/1 |
| 2012/0204251 | A1* | 8/2012 | Kopti | H04L 63/20 | 726/11 |
| 2012/0215918 | A1* | 8/2012 | Vasters | H04L 67/02 | 709/226 |
| 2012/0216052 | A1* | 8/2012 | Dunn | G06F 21/78 | 713/193 |
| 2012/0240110 | A1* | 9/2012 | Breitgand | H04L 67/101 | 718/1 |
| 2012/0265976 | A1* | 10/2012 | Spiers | G06F 21/57 | 713/2 |
| 2012/0266231 | A1* | 10/2012 | Spiers | G06F 9/45533 | 726/12 |
| 2013/0007845 | A1* | 1/2013 | Chang | H04L 63/104 | 726/4 |
| 2013/0013767 | A1* | 1/2013 | Stober | G06F 9/44505 | 709/224 |
| 2013/0014107 | A1* | 1/2013 | Kirchhofer | G06F 9/5083 | 718/1 |
| 2013/0018703 | A1* | 1/2013 | Majeed | G06Q 10/06 | 705/7.38 |
| 2013/0060838 | A1* | 3/2013 | Yaffe | G06F 9/5027 | 709/203 |
| 2013/0066945 | A1* | 3/2013 | Das | G06F 8/60 | 709/203 |
| 2013/0111558 | A1* | 5/2013 | Sangubhatla | H04L 63/102 | 726/4 |
| 2013/0152078 | A1* | 6/2013 | Arcilla | G06F 9/45558 | 718/1 |
| 2013/0159062 | A1* | 6/2013 | Stiehl | G06Q 10/06 | 705/7.36 |
| 2013/0204917 | A1* | 8/2013 | Wang | G06F 9/5066 | 709/201 |
| 2013/0227563 | A1* | 8/2013 | McGrath | G06F 8/60 | 718/1 |
| 2013/0232463 | A1* | 9/2013 | Nagaraja | G06F 8/70 | 717/101 |
| 2013/0232498 | A1* | 9/2013 | Mangtani | G06F 9/5038 | 718/104 |
| 2013/0238641 | A1* | 9/2013 | Mandelstein | G06F 16/27 | 707/E17.014 |
| 2013/0304788 | A1* | 11/2013 | DeLuca | G06F 8/61 | 709/201 |
| 2014/0068335 | A1* | 3/2014 | Bromley | H04L 43/50 | 714/E11.177 |
| 2014/0075021 | A1* | 3/2014 | Revanuru | H04L 41/40 | 709/224 |
| 2014/0075031 | A1* | 3/2014 | Doering | G06Q 30/0633 | 709/226 |
| 2014/0075499 | A1* | 3/2014 | Arun | G06F 16/27 | 726/1 |
| 2014/0075565 | A1* | 3/2014 | Srinivasan | H04L 63/08 | 726/26 |
| 2014/0101299 | A1* | 4/2014 | Cherel | G06F 9/468 | 709/223 |
| 2014/0280625 | A1* | 9/2014 | Byrd Vallieres de St. Real | H04L 67/535 | 709/204 |
| 2014/0282472 | A1* | 9/2014 | Vinograd | G06F 8/63 | 717/170 |
| 2014/0282545 | A1* | 9/2014 | Richards | G06F 9/5072 | 718/1 |
| 2014/0324860 | A1* | 10/2014 | Rogers | G06F 3/0665 | 707/736 |
| 2017/0060613 | A1* | 3/2017 | Warkentin | G06F 9/45545 | |
| 2019/0166022 | A1 | 5/2019 | Revanuru | | |

OTHER PUBLICATIONS

Chauhan, et al., "On-Demand Sourcing: Driving Costs Down and Value Up in a Period of Increased Business Volatility", Jun. 11, 2010, 5 pages.
"Cost Effective Security and Compliance with Oracle Database 11g Release 2", An Oracle White Paper, Mar. 2011, 14 pages.
"Creating a Self-Service Dev/Test Cloud: A Case Study from Oracle Product Development IT", An Oracle White Paper, Jul. 2011, 12 pages.
Glas, et al., "Achieving the Cloud Computing Vision", An Oracle White Paper in Enterprise Architecture, Oct. 2010, 22 pages.
Gulati, "Cloud Management Using Oracle Enterprise Manager 11g", An Oracle White Paper, Apr. 2010, 25 pages.
Joshi, et al., "Bridging the Divide between SaaS and Enterprise Datacenters", An Oracle White Paper, Feb. 2010, 18 pages.
Kumar, et al., "The Most Complete and Integrated Virtualization: From Desktop to Datacenter", An Oracle White Paper. Oct. 2010, 13 pages.
McKendrick, "Privatizing the Cloud", Oct. 2010, 33 pages, IOUG Survey on Cloud Computing.
Oracle, "Oracle Exadata Database Machine: Security Overview", © 2011, 2 pages.
Oracle, "Oracle Identity Management 11g", 2010, 4 pages.
"Oracle Offers ISVs Comprehensive Platform to Deliver SaaS Applications", 2008, 2 pages.
"Oracle Optimized Solution for Enterprise Cloud Infrastructure", An Oracle Technical White Paper, Jun. 2011, 32 pages.
Piech, "Platform-as-a-Service Private Cloud with Oracle Fusion Middleware", An Oracle White Paper, Oct. 2009, 20 pages.
Oracle, "Reduce TCO and Get More Value from your X86 Infrastructure", © 2011, 4 pages.
Silverstein, et al., "Architectural Strategies for IT Optimization: From Silos to Clouds", An Oracle White Paper on Enterprise Architecture, May 2010, 21 pages.
Thanawala, et al., "Oracle SaaS Platform: Building On-Demand Applications", An Oracle White Paper, Sep. 2008, 21 pages.
Venkataraman, et al., "Oracle's Cloud Solutions for Public Sector", An Oracle White Paper, Apr. 2011, 28 pages.
Wahl, et al., "Oracle Advanced Security with Oracle Database 11g Release 2", Oracle White Paper, Oct. 2010, 12 pages.
Wang, "Oracle Cloud Computing", An Oracle White Paper, Jun. 2011, 16 pages.

* cited by examiner

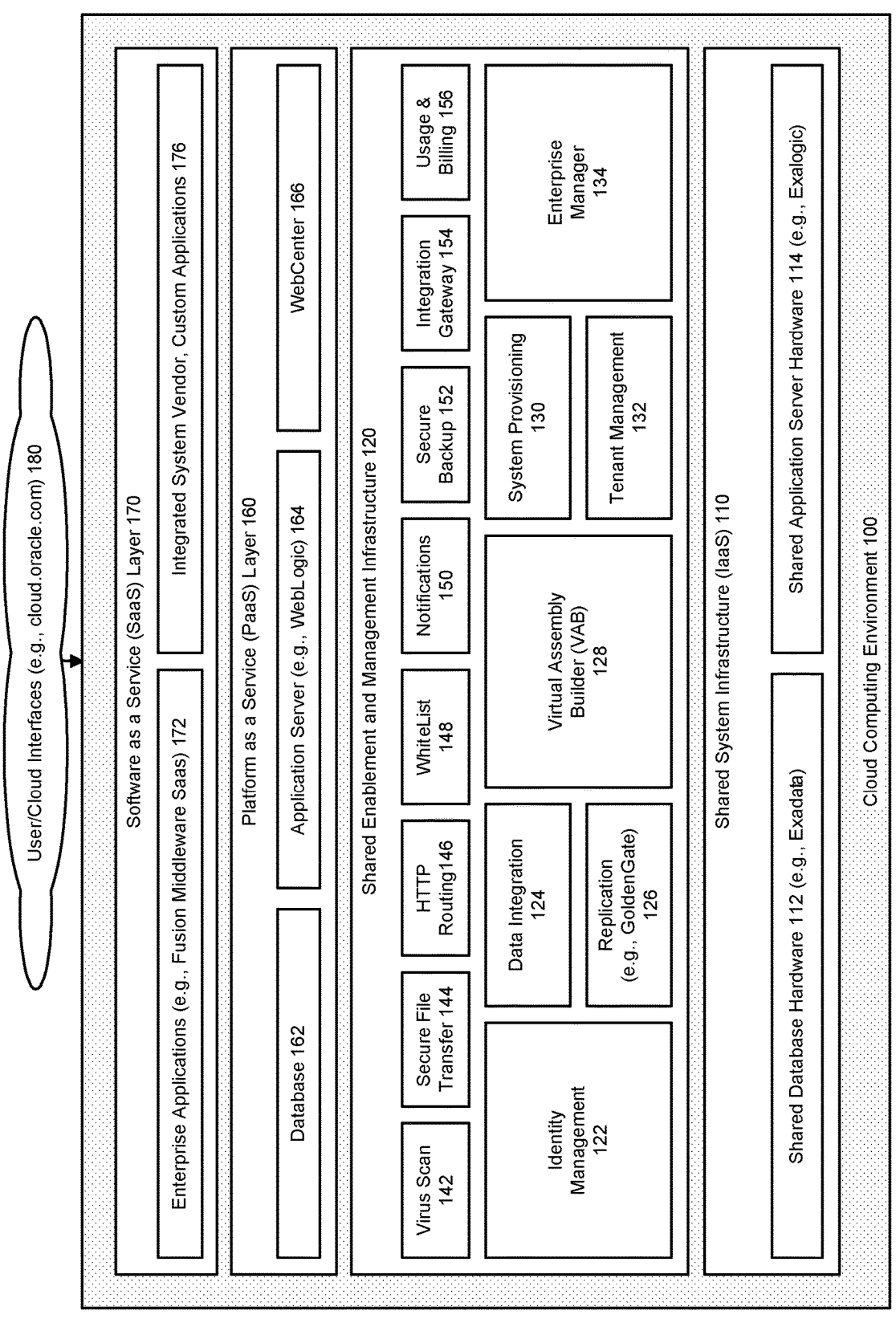

User/Cloud Interfaces (e.g., cloud.oracle.com) 180

Software as a Service (SaaS) Layer 170

Enterprise Applications (e.g., Fusion Middleware Saas) 172

Integrated System Vendor, Custom Applications 176

Platform as a Service (PaaS) Layer 160

Database 162

Application Server (e.g., WebLogic) 164

WebCenter 166

Shared Enablement and Management Infrastructure 120

Virus Scan 142

Secure File Transfer 144

HTTP Routing 146

WhiteList 148

Notifications 150

Secure Backup 152

Integration Gateway 154

Usage & Billing 156

Identity Management 122

Data Integration 124

Virtual Assembly Builder (VAB) 128

System Provisioning 130

Enterprise Manager 134

Replication (e.g., GoldenGate) 126

Tenant Management 132

Shared System Infrastructure (IaaS) 110

Shared Database Hardware 112 (e.g., Exadata)

Shared Application Server Hardware 114 (e.g., Exalogic)

Cloud Computing Environment 100

FIGURE 1

SYSTEM AND METHOD FOR PROVIDING A CLOUD COMPUTING ENVIRONMENT

CLAIM OF PRIORITY

This application is a continuation of U.S. Patent Application titled "SYSTEM AND METHOD FOR PROVIDING A CLOUD COMPUTING ENVIRONMENT", application Ser. No. 16/265,107, filed Feb. 1, 2019; which is a continuation of U.S. Patent Application titled "SYSTEM AND METHOD FOR PROVIDING A CLOUD COMPUTING ENVIRONMENT", application Ser. No. 14/021,965, filed Sep. 9, 2013, and subsequently issued as U.S. Pat. No. 10,225,164 on Mar. 5, 2019; which claims the benefit of priority to U.S. Provisional Patent Application titled "SYSTEM AND METHOD FOR PROVIDING A CLOUD COMPUTING ENVIRONMENT", Application No. 61/799, 465, filed Mar. 15, 2013; U.S. Provisional Patent Application titled "SYSTEM AND METHOD FOR PROVIDING A CLOUD COMPUTING ENVIRONMENT", Application No. 61/698,317, filed Sep. 7, 2012; U.S. Provisional Patent Application titled "SYSTEM AND METHOD FOR PROVIDING A CLOUD COMPUTING ENVIRONMENT", Application No. 61/698,321, filed Sep. 7, 2012; U.S. Provisional Patent Application titled "SYSTEM AND METHOD FOR PROVIDING A CLOUD COMPUTING ENVIRONMENT", Application No. 61/698,325, filed Sep. 7, 2012; U.S. Provisional Patent Application titled "SYSTEM AND METHOD FOR PROVIDING A CLOUD COMPUTING ENVIRONMENT", Application No. 61/698, 330, filed Sep. 7, 2012; U.S. Provisional Patent Application titled "SYSTEM AND METHOD FOR PROVIDING A CLOUD COMPUTING ENVIRONMENT", Application No. 61/698,335, filed Sep. 7, 2012; U.S. Provisional Patent Application titled "SYSTEM AND METHOD FOR PROVIDING A CLOUD COMPUTING ENVIRONMENT", Application No. 61/698,454, filed Sep. 7, 2012; and U.S. Provisional Patent Application titled "SYSTEM AND METHOD FOR PROVIDING A CLOUD COMPUTING ENVIRONMENT", Application No. 61/698,473, filed Sep. 7, 2012; each of which above applications are herein incorporated by reference.

COPYRIGHT NOTICE

FIELD OF INVENTION

Embodiments of the invention are generally related to cloud computing environments, and in particular to systems and methods for enabling a cloud computing environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been previously provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications.

Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above examples are provided to illustrate some of the types of environment within which embodiments of the invention can generally be used. In accordance with various embodiments, the systems and methods described herein can also be used with other types of cloud or computing environments.

SUMMARY

Described herein is a system and method for enabling a cloud computing environment. In accordance with an embodiment, the system can include a variety of hardware and/or software components and features, which can be used in delivering an infrastructure, platform, and/or applications to support public and private clouds.

BRIEF DESCRIPTION OF THE FIGURES

FIG. 1 illustrates a cloud computing environment including service layers, in accordance with an embodiment.

DETAILED DESCRIPTION

Figure 2:
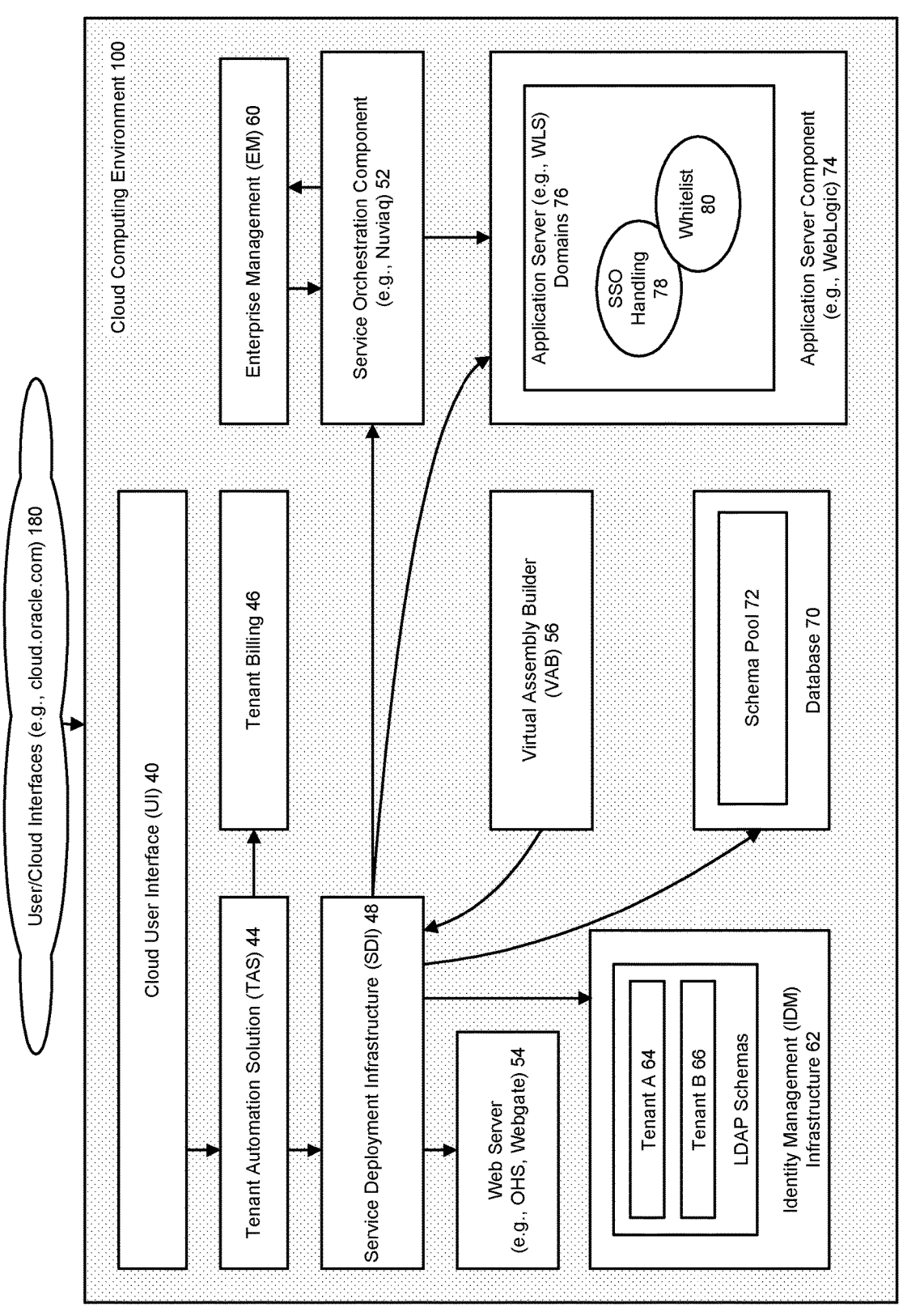
FIG. 2 further illustrates a cloud computing environment, in accordance with an embodiment.

As described above, a cloud computing environment (cloud environment, or cloud) can be implemented in a variety of different ways to best suit different requirements: for example, public cloud, private cloud, community cloud, or hybrid cloud. A cloud computing model enables some of those responsibilities which previously may have been previously provided by an organization's own information technology department, to instead be delivered as service layers within a cloud environment, for use by consumers (either within or external to the organization, according to the cloud's public/private nature).

Described herein are a variety of hardware and/or software components and features, which can be used in delivering an infrastructure, platform, and/or applications to support cloud computing environments. In accordance with various embodiments, the system can also utilize hardware and software such as Oracle Exalogic and/or Exadata machines, WebLogic and/or Fusion Middleware, and other hardware and/or software components and features, to provide a cloud computing environment which is enterprise-grade, enables a platform for development and deploying applications, provides a set of enterprise applications built on modern architecture and use cases, and/or provides flexible consumption choices.

In accordance with an embodiment, a cloud computing environment (cloud environment, or cloud) can generally include a combination of one or more Infrastructure as a Service (IaaS) layer, Platform as a Service (PaaS) layer, and/or Software as a Service (SaaS) layer, each of which are delivered as service layers within the cloud environment, and which can be used by consumers within or external to the organization, depending on the particular cloud computing model being used.

In accordance with an embodiment, the cloud computing environment can be implemented as a system that includes one or more conventional general purpose or specialized digital computers, computing devices, machines, microprocessors, memory and/or computer readable storage media, for example the computer hardware, software, and resources provided by Oracle Exalogic, Exadata, or similar machines.

In accordance with an embodiment, the cloud computing environment can include a shared enablement and management infrastructure, which is described in further detail below, and which provides enablement and management tools that can be used to support the various service layers.

FIG. 1 illustrates a cloud computing environment 100, in accordance with an embodiment. As shown in FIG. 1, in accordance with an embodiment, each of the IaaS 110, PaaS 160, and/or SaaS 170 layers can generally include a variety of components. For example, in accordance with an embodiment, the IaaS layer can include a shared database hardware (e.g., an Exadata machine) 112, and/or a shared application server hardware (e.g., an Exalogic machine) 114. The PaaS layer can include one or more PaaS services, such as a database service 162, application service 164, and/or Web-Center service 166. The SaaS layer can include various SaaS services, such as enterprise applications (e.g., Oracle Fusion SaaS) 172, and/or ISV or custom applications 176, that can be accessed by one or more user/cloud interfaces 180.

As described above, in accordance with an embodiment, the cloud computing environment can also include a shared enablement and management infrastructure 120. For example, as shown in FIG. 1, the shared enablement and management infrastructure can include one or more identity management 122, data integration 124, replication (e.g., Oracle GoldenGate) 126, virtual assembly builder 128, system provisioning 130, tenant management 132, and/or enterprise manager components 134.

As further shown in FIG. 1, in accordance with an embodiment, the shared enablement and management infrastructure can also include other components, such as virus scan 142, secure file transfer 144, HTTP routing 146, whitelist 148, notifications 150, secure backup 152, integration gateway 154, and/or usage & billing 156 components.

The example shown in FIG. 1 is provided as an illustration of some of the types of components which can be included in a cloud computing environment, or within a shared enablement and management infrastructure. In accordance with other embodiments, different and/or other types or arrangements of components can be included.

FIG. 2 further illustrates a cloud computing environment, in accordance with an embodiment. As shown in FIG. 2, in accordance with an embodiment, a variety of hardware and/or software components and features, can be included to together deliver an infrastructure, platform, and/or applications that can be used to support public and private clouds.

In accordance with an embodiment, the cloud computing environment can include, for example, a cloud user interface component 40, which allows access to the cloud environment; a tenant automation solution 44 and billing 46, which manages business processes associated with a customer order; a service deployment infrastructure 48, which supports deployment automation; an identity management infrastructure 62, which supports the use of multiple enterprise and tenant schemas 64, 66; a shared database 70 and schema pool 72; a service orchestration component 52, which supports self-service, scalability, and automation; an enterprise manager 60, which allows customers/tenants to monitor and manage their cloud services and applications 74, 76; a virtual assembly builder component 56, which supports the use of service instance templates, and allows personalities to be assignment to service instances; and additional features such as, e.g., support for SSO handling 78, whitelist functionality 80, or Web server (e.g., OHS, Webgate) access 54, each of which are described in further detail below.

Java Cloud Service

In accordance with an embodiment, a Java Cloud Service (JCS) enables cloud customers/tenants to obtain a dedicated set of application server (e.g., J2EE, or WebLogic) instances, based on a subscription level. In accordance with an embodiment, server instances can run in their own virtual machine (VM) instance, and a virtual assembly builder component (e.g., OVAB) can be used for deployment and teardown of service instances. In accordance with an embodiment, customers can have multiple subscriptions, and instances provisioned based on subscription configuration. Incoming requests can be, e.g., load-balanced to HTTP servers, and routed to appropriate instances.

Tenant Automation Solution

In accordance with an embodiment, a Tenant Automation Solution (TAS) can be provided to manage business processes associated with a customer order, and determine whether an order should proceed to provisioning. In accordance with an embodiment, TAS can interact with a System Deployment Infrastructure (SDI), e.g., for service instance creation, deletion, and scale up.

Service Deployment Infrastructure

In accordance with an embodiment, a Service Deployment Infrastructure (SDI) provides deployment automation for TAS, including automation for the business processing used by customers to create new services. In accordance with an embodiment, SDI can act as an intelligent orchestrator for provisioning requests and providing web services to TAS.

IDM Infrastructure

In accordance with an embodiment, to support multiple enterprises and tenants, an IDM infrastructure can be provided, wherein each tenant can be associated with an Identity Domain, with its own unique name space, such that each tenant's Identity Domain is isolated from one other. In accordance with an embodiment, when a customer subscribes to a service for the first time, an Identity Domain can be created in IDM, and associated with that customer.

Enterprise Manager

In accordance with an embodiment, an Enterprise Manager can be provided to allow customers to monitor and manage their Java Cloud Service (JCS) instances and J2EE applications, e.g., by managing the lifecycle of applications deployed to those instances.

HTTP Traffic Routing

In accordance with an embodiment, the system can support routing of HTTP traffic, e.g., from published endpoints or URL's, to individual service instances. In accordance with an embodiment, a routing layer can be based on a common shared set of HTTP server (e.g., OHS) instances that are configured to route traffic from clients to appropriate service instances. In accordance with an embodiment, the routing layer can include multiple pools of OHS instances, with a pool per service type.

Request Throttling

In accordance with an embodiment, a throttling feature provides a means to ensure customers cannot circumvent user limits, such as making large number of service calls, e.g., by limiting the number of concurrent user requests a particular tenant can have.

Whitelist

In accordance with an embodiment, a whitelist feature can be provided, wherein customers can, e.g., specify a list or range of acceptable client addresses for their services, which provides a means of limiting access to services to a range of trusted addresses. In accordance with an embodiment, the whitelist can be configurable for a tenant, to protect the services belonging to that tenant. For examples, OHS instances within a HTTP routing layer can consult the whitelist, if present, and reject requests that do not originate from an address on the whitelist.

Service Orchestration

In accordance with an embodiment, a service orchestration component can be provided to further support self-service, scalability, and automation, including managing processes throughout the cloud environment.

Virtual Assembly Builder

In accordance with an embodiment, a virtual assembly builder component (e.g., OVAB) can be provided, to support the use of service instance templates, provision empty service instances, and allow personalities to be assignment to service instances. In accordance with an embodiment a Deployer component can maintain a repository of virtualization format archives (e.g., OVA) created by a Studio or design-time development component, and provide options for registering OVA's to virtualized systems such as VM servers, and orchestrating the deployment of software defined by the OVA.

Cloud Services

In accordance with an embodiment, a cloud environment, such as Oracle Public Cloud (OPC), can include a Java cloud services (JCS) infrastructure, which allows a suite of software applications, middleware, and database offerings to be delivered to customers in a self-service, elastically scalable manner.

In accordance with an embodiment, the JCS infrastructure can orchestrate, in combination with other cloud environment components, the creating and/or updating of a platform instance of a Java cloud service (Java service), including provisioning and deployment of the platform instance and/or deployment of software applications, and one or more personality injection or application deployment processing. Additional resources and/or services, such as a database service, can be wired to or otherwise associated with the Java cloud service, for use by customer applications that are deployed to the cloud.

In accordance with an embodiment, the JCS infrastructure enables cloud customers to obtain a dedicated set of application server (e.g., J2EE, or WebLogic) instances, based on a subscription level. In accordance with an embodiment, server instances can run in their own virtual machine (VM) instance, and a virtual assembly builder component (e.g., OVAB) can be used for deployment and teardown of service instances. In accordance with an embodiment, customers can be associated with one or more tenants and/or one or more Java cloud service subscriptions, and instances can be provisioned based on the subscription configuration. Incoming requests can be, e.g., load-balanced to HTTP servers, and routed to appropriate tenants and instances.

Functionally, the JCS infrastructure allows for the self-service provisioning of Java cloud service instances. Once provisioned, a customer's service administrators can interact with the service by, e.g. deploying EAR and WAR files, as they would to a traditional non-cloud application server environment, subject to certain cloud-provider guidelines, such as application whitelist validation.

In accordance with an embodiment, a Java cloud service instance can be a WebLogic Server (WLS) based Java EE application server. In accordance with such embodiments, each tenant receives a dedicated set of WLS server instances that include a WLS administration server and one or a plurality of managed servers based on their subscription level. These servers are run within their own virtual machine (VM) instance, which allows the use of virtual assembly builder components and products, such as Oracle Virtual Assembly Builder assemblies, to be used for the quick and flexible deployment and teardown of service instances. In accordance with an embodiment, tenants also receive their own database schema.

Figure 3:
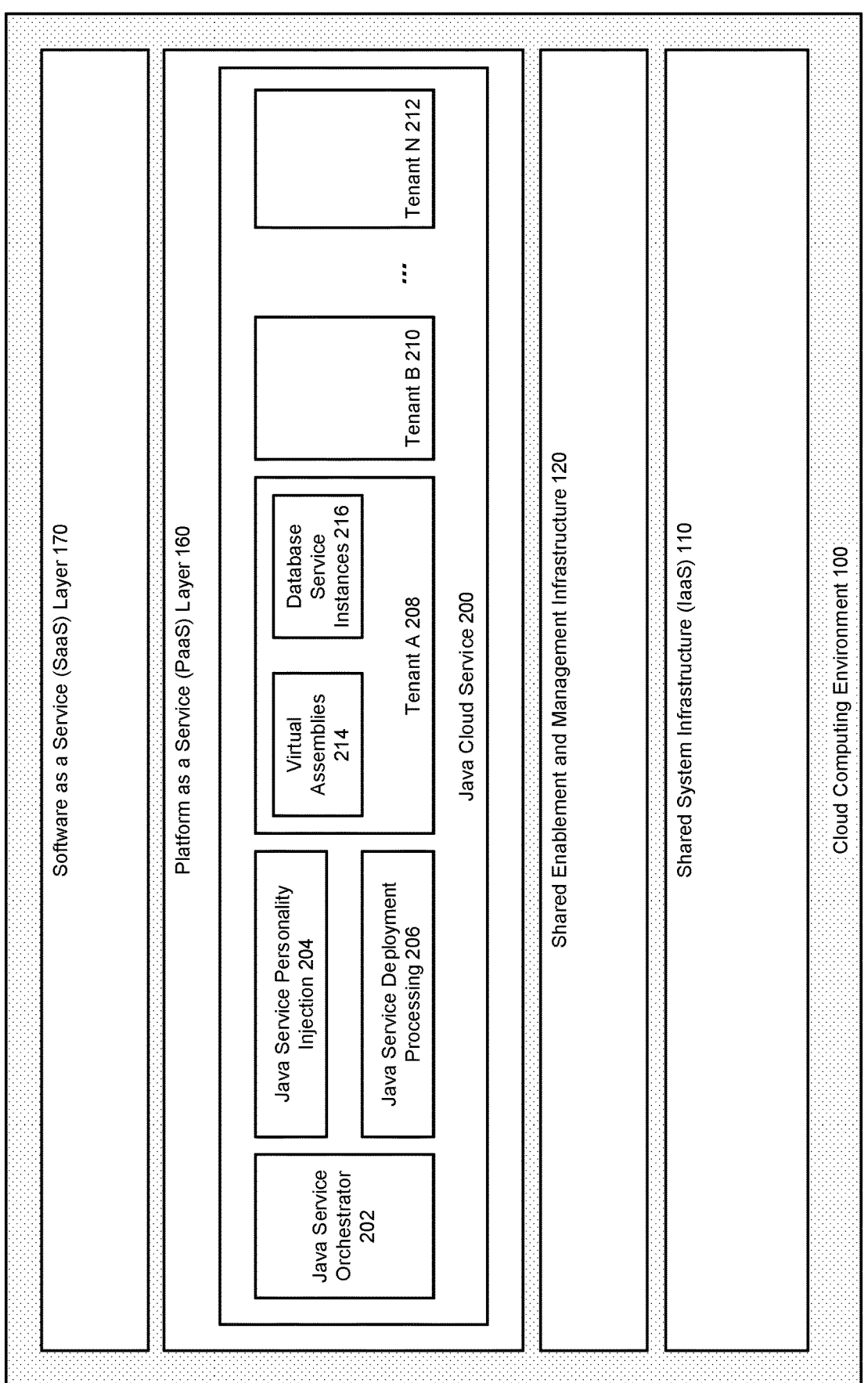
FIG. 3 illustrates an environment that can include a Java cloud service component, in accordance with an embodiment.

FIG. 3 illustrates an environment that can include a Java cloud service component, in accordance with an embodiment. As shown in FIG. 3, in accordance with an embodiment, the Java cloud service component can include a Java service orchestrator 202, and components for performing Java service personality injection 204, Java service deployment processing 206, and creating one or more tenants 208, 210, 212, each with one or more service instances and virtual assemblies 214, and database service instances 216.

In the context of a JCS infrastructure, a Java cloud service can include one or more hosts running, e.g., operating system (OS) and middleware components. Customer/user applications can be developed and deployed into their Java service instance, where they can be run in the cloud similarly to how those applications would run in a traditional non-cloud application server environment. Multiple tenants, each with their own Java service instances, can utilize common, e.g., computer hardware resources, while their Java service environments and their customer applications are securely separated from one another.

In accordance with an embodiment, the use of a JCS infrastructure, and deploying applications to a Java service, also enables customers/users to take advantage of various/additional cloud environment features, such as centralized Java service patching, which is described in further detail below.

Figure 4:
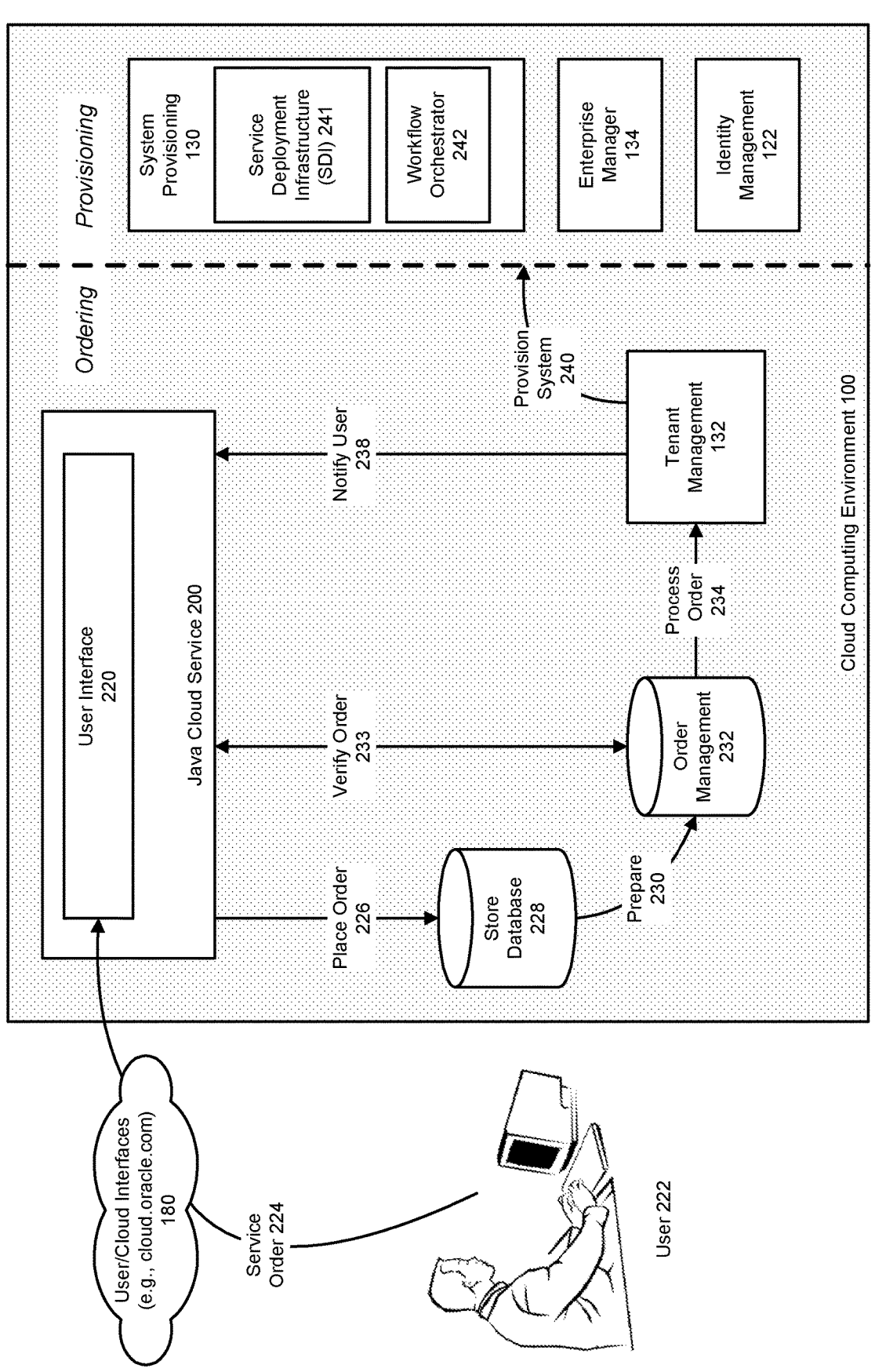
FIG. 4 further illustrates an environment that includes a Java cloud service component, in accordance with an embodiment.

FIG. 4 further illustrates an environment that includes a Java cloud service component, in accordance with an embodiment. As shown in FIG. 4, in accordance with an embodiment, a cloud environment which includes one or more services that can be customized for use with a cloud tenant (such as a Java cloud service 200) can be associated with a user interface 220 that enables a user 222 to either place an order 224 for a new instance of that service, and/or manage an existing service instance.

In accordance with an embodiment, ordering of a new instance of a service can include both ordering and provisioning phases. During the ordering phase, the user can place an order 226, which is initially recorded in a store database 228, where it is prepared 230, and then provided to an order management component 232. After the user has verified the particulars of their order 233, the order can be processed 234 including, in accordance with an embodiment, passing the order to the tenant management component for provisioning 240. At various stages of the order process, the user can be notified as to their current order status 238.

Subsequently, during the provisioning phase, the system can call upon one or more system provisioning components including, in accordance with an embodiment, components such as a service deployment infrastructure (SDI) 241, and a workflow orchestrator 242, to orchestrate the remaining steps of the provisioning process.

For example, in accordance with an embodiment, the JCS infrastructure can interact with shared enablement and management infrastructure components such as a Tenant Automation Solution (TAS) to manage business processes associated with a customer order, and determine whether an order should proceed to provisioning; a System Deployment Infrastructure (SDI) for service instance creation, deletion, and scale up; an IDM infrastructure which associates each tenant with an Identity Domain and unique name space, such that each tenant's Identity Domain is isolated from one other; or a virtual assembly builder component (e.g., OVAB) to support the use of service instance templates, provision empty service instances, and allow personalities to be assignment to service instances.

In accordance with an embodiment the virtual assembly builder component can maintain a repository of virtualization format archives (e.g., OVA) created by a Studio or design-time development component, and can provide options for registering OVAs to virtualized systems such as VM servers, orchestrating the deployment of software defined by the OVA, and providing access to assemblies, e.g., through the use of a deployer interface.

Figure 5:
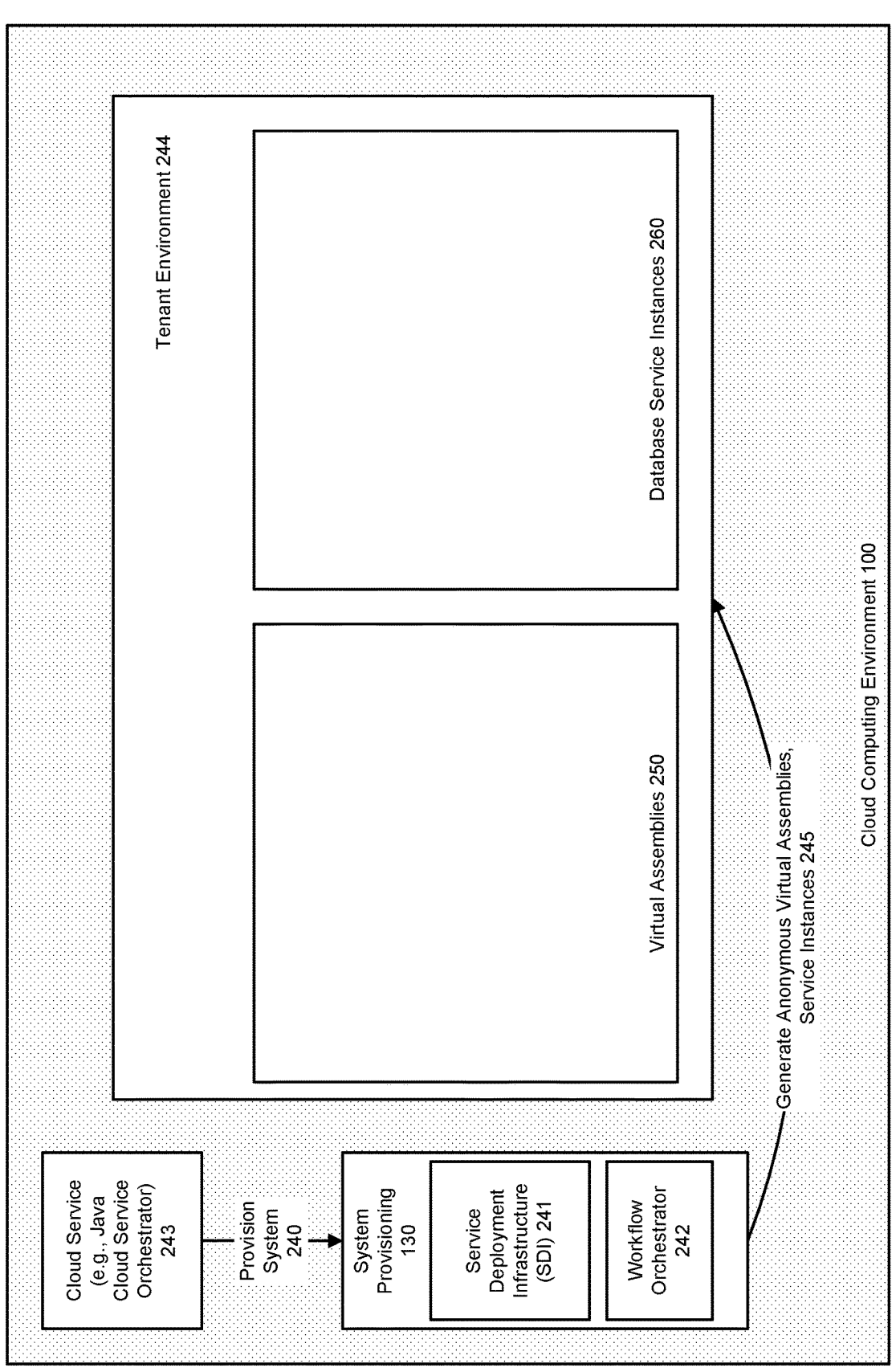
FIG. 5 illustrates how an environment that includes a Java cloud service can use virtual assemblies, in accordance with an embodiment.

FIG. 5 illustrates how an environment that includes a Java cloud service can use virtual assemblies, in accordance with an embodiment. As shown in FIG. 5, a tenant environment is created 244, by generating 245 virtual assemblies 250 and/or service instances 260. Initially, virtual assemblies and service instances will be anonymous. They will receive personalities later in the process.

Figure 6:
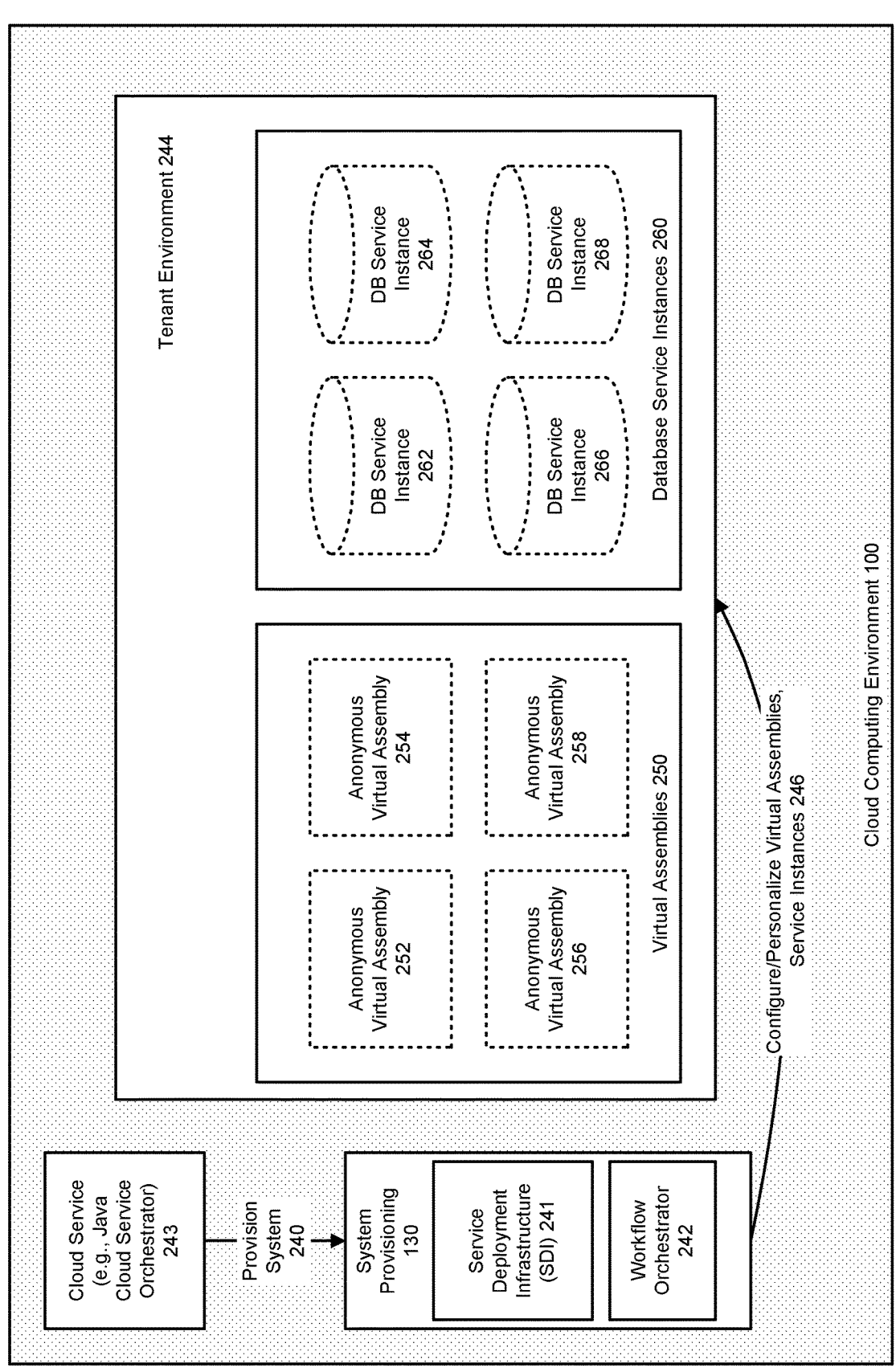
FIG. 6 further illustrates the use of virtual assemblies, in accordance with an embodiment.

FIG. 6 further illustrates the use of virtual assemblies, in accordance with an embodiment. As shown in FIG. 6, the system can create a plurality of anonymous virtual assemblies 252, 254, 256, 258 and service instances (in this example, database service instances 262, 264, 266, 268). In accordance with an embodiment, a tenant receives a dedicated set of application server (e.g. WLS) server instances and one or a plurality of managed servers based on their subscription level, wherein each server runs within its own virtual machine (VM) instance. Each of the assemblies and/or service instances can then be configured 246 to meet the order requirements.

Figure 7:
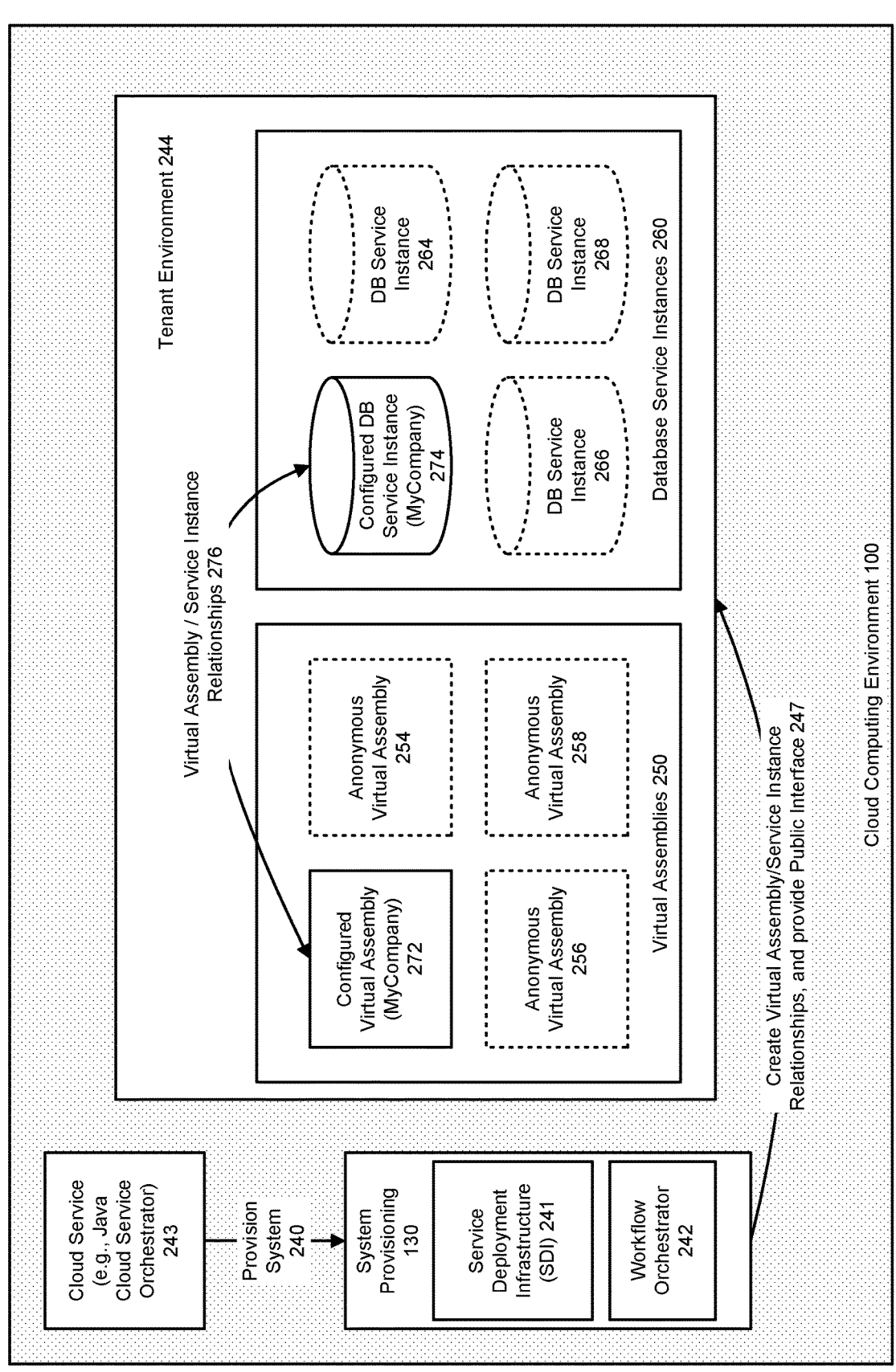
FIG. 7 further illustrates the use of virtual assemblies, in accordance with an embodiment.

FIG. 7 further illustrates the use of virtual assemblies, in accordance with an embodiment. As shown in FIG. 7, a particular virtual assembly 274 and/or particular service instance 276 is configured to suit the order (e.g. MyCompany), and at the same time its public interfaces are created 247. For example, in the context of a Java cloud service, the resultant platform instance will contain all of those resources that are required to provide a WebLogic or other application server service, for a given tenant according to their order, including, e.g., an instance database, administration server, and one or more application servers. Each of the configured virtual assembly can include a relationship 276 to a service instance.

Figure 8:
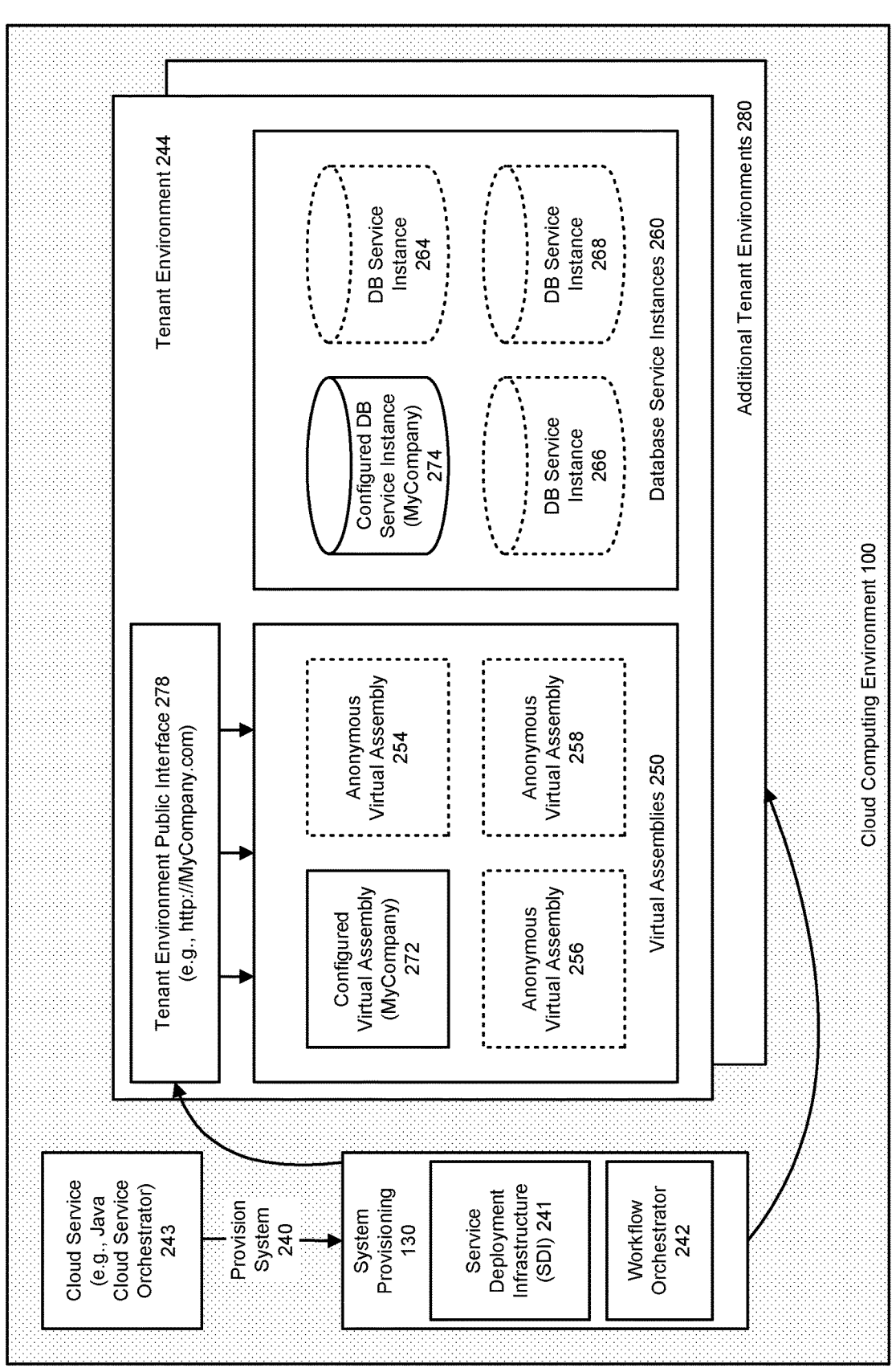
FIG. 8 further illustrates the use of virtual assemblies, in accordance with an embodiment.

FIG. 8 further illustrates the use of virtual assemblies, in accordance with an embodiment. As shown in FIG. 8, a public interface is created 278 for use by the tenant (e.g. http://MyCompany.com). The process can be repeated for other tenants 280. Incoming requests can then be, e.g., load-balanced to HTTP servers, and routed to appropriate tenants and instances.

Figure 9:
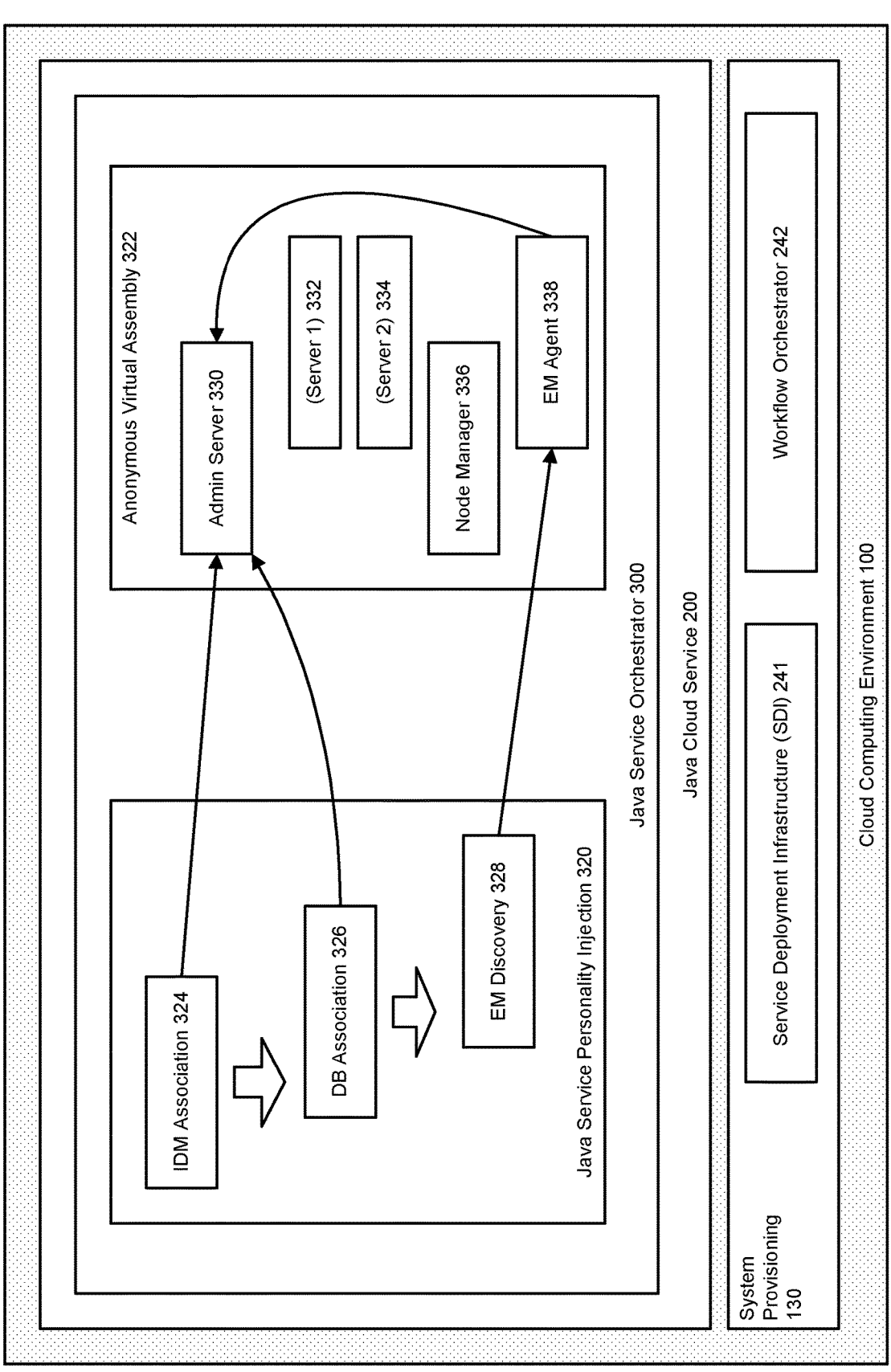
FIG. 9 illustrates Java cloud service personality injection, in accordance with an embodiment.

FIG. 9 illustrates Java cloud service personality injection, in accordance with an embodiment. As described above, in accordance with an embodiment, the features of a workflow orchestrator as described above can be used with any service, including JCS, to allow a Java service to be customized for use with a cloud tenant. In accordance with an embodiment, a cloud environment which includes a service that can be customized for use with a cloud tenant, such as a Java cloud service, can be associated with a user interface that enables a user to place an order for a new instance of that service.

As shown in FIG. 9, in accordance with an embodiment, upon receiving an order, the service (in this example the Java cloud service) can utilize the workflow orchestrator to perform the tasks necessary to instantiate a platform instance for that particular service (i.e., in this example the workflow orchestrator acts as a Java service orchestrator 300).

In the example shown in FIG. 9, in order to create a Java cloud service platform instance, an anonymous assembly 322 is first created, e.g., by requesting that SDI and/or OVAB create an anonymous assembly.

Then, a personality 320 is injected into the anonymous assembly, to configure the assembly for use by the tenant. In accordance with an embodiment, personalization can include, e.g., performing identity management (IDM) association 324, database association 326, and enterprise management discovery 328. Each of these steps can be coordinated by the workflow orchestrator, in combination with additional components or systems as appropriate.

The result of personality injection is one or more personalized assemblies including, depending on the particular order being processed, an administration server 330, one or more (e.g., WebLogic) application server instances 332, 334, a node manager 336, and an enterprise management agent 338.

Figure 10:
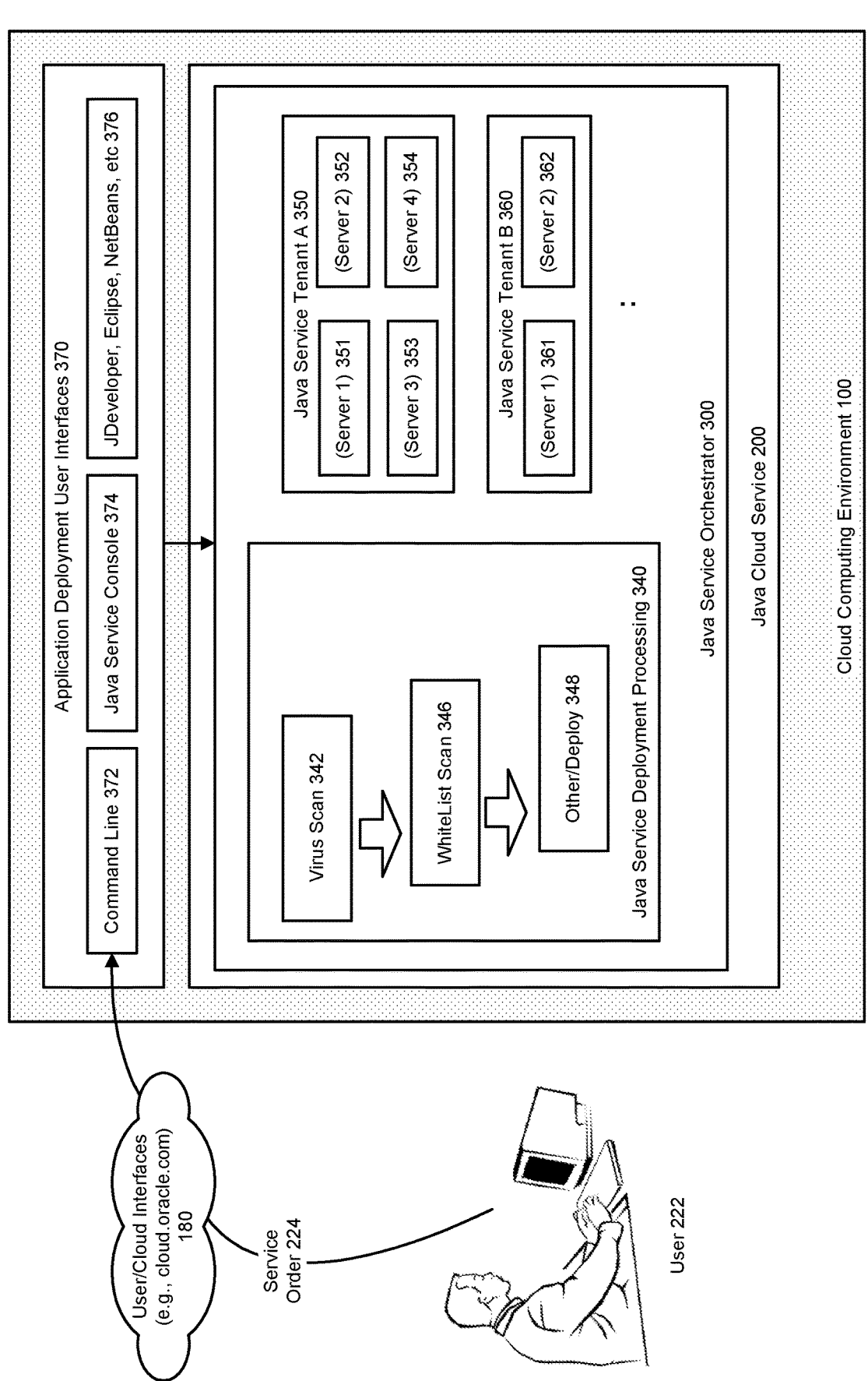
FIG. 10 illustrates Java cloud service deployment processing, in accordance with an embodiment.

FIG. 10 illustrates Java cloud service deployment processing, in accordance with an embodiment. As shown in FIG. 10, in accordance with an embodiment, deployment of a Java cloud service can include additional procedures or functions, such as scanning for viruses 342, or performing whitelist scanning 346, or other deployment-related functions 348. Each of these steps can again be coordinated by the workflow orchestrator, in combination with additional components or systems as appropriate.

As a result of deployment, one or more Java cloud service tenants 350, 360 can be deployed, including one or more server instances (in this example, Tenant A has four application server instances 351, 352, 353, 354; while Tenant B has two application server instances 361, 362), each of which have been personalized and, e.g., scanned for viruses and whitelist conformation, or otherwise prepared according to the particular configuration of the platform instance.

In accordance with an embodiment, the system can also include one or more application deployment user interfaces 370, such as a command line interface 372, Java service console 374, J Developer 376, or other interfaces that allow the user to deploy their applications to, in this example a Java cloud service tenant.

In accordance with an embodiment, the above steps can be performed in combination with a workflow orchestrator which can be used to orchestrate operations between the cloud environment and the PaaS environment, e.g., by receiving a request from a tenant automation system, and coordinating the provisioning and deployment of virtual assemblies or applications, including use of the shared enablement and management infrastructure.

In accordance with an embodiment, the workflow orchestrator can perform additional procedures or functions during its orchestration of the provisioning or deployment, e.g., scanning an application for viruses, or comparing the application being deployed against a whitelist of acceptable API calls. The workflow orchestrator can also enable creation and management of platform instances, each of which can include one or more application server (e.g., WebLogic server) instances, together with other resources that are useful for running applications (e.g., a database service), and which can be run on shared hardware resources.

Each workflow orchestrator job is a sequence of actions specific to a particular PaaS workflow, e.g., the provisioning of a Java cloud service platform instance. Actions are typically performed in a sequential order, with failure in any step resulting in failure of the overall job. Depending on the service platform configuration, some workflow actions may delegate actions to external systems relevant to the workflow, such as an enterprise manager, or a service deployment infrastructure.

Figure 11:
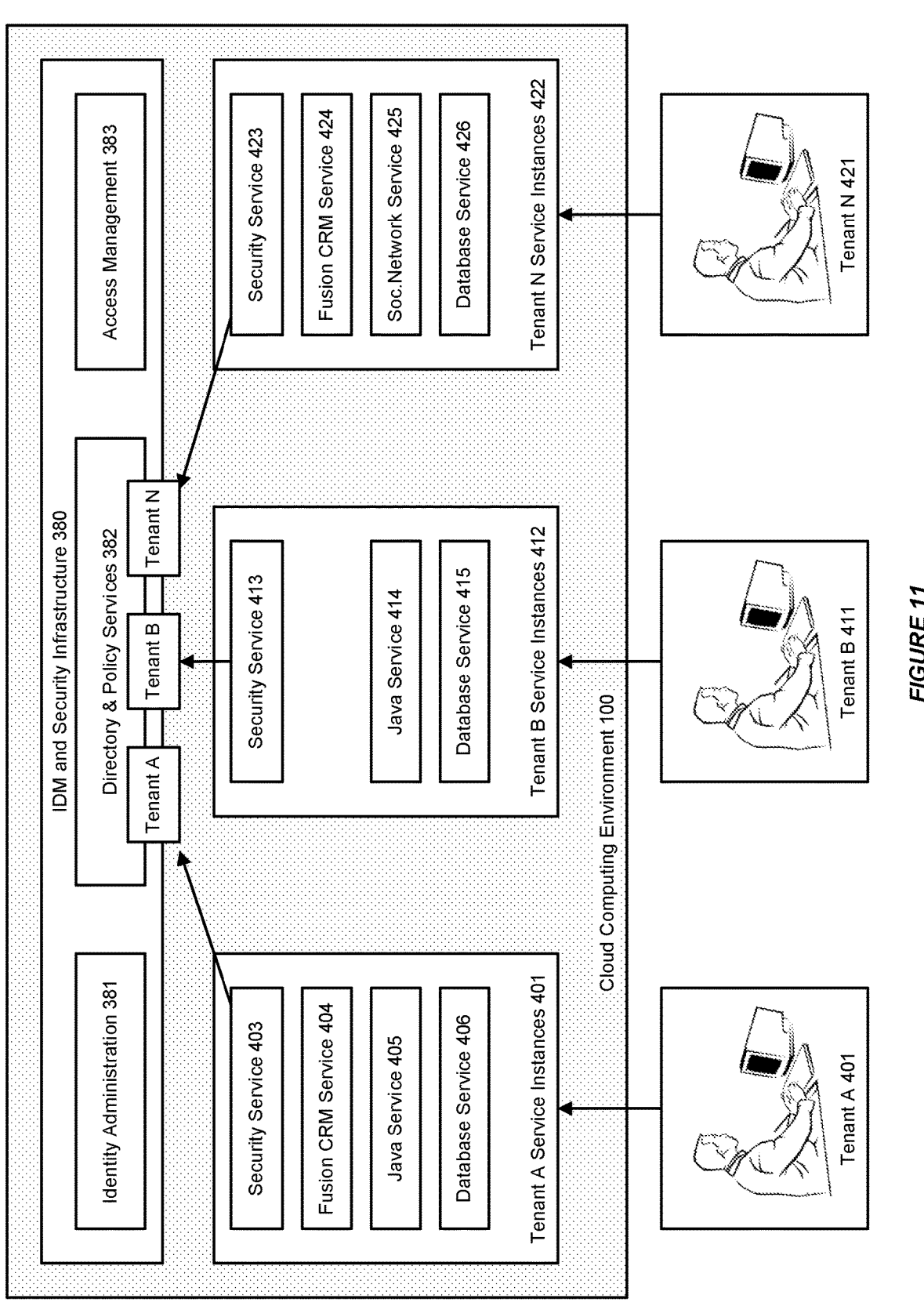
FIG. 11 illustrates support for multiple tenants in an environment that includes a Java cloud service, in accordance with an embodiment.

FIG. 11 illustrates support for multiple tenants in an environment that includes a Java cloud service, in accordance with an embodiment. In accordance with an embodiment, an identity domain provides a persistent namespace for use with a tenant's security artifacts. Each identity domain represents a "slice" of the shared identity domain system, provisioned for a particular tenant. As shown in FIG. 11, in accordance with an embodiment, an IDM and security infrastructure 380, together with identity administration 381, director and policy service 382, and access management 383, can be used to support multiple tenants 401, 411, 421, each with different service requirements 401, 412, 422. For example as shown in FIG. 11, tenant A's service instances can include a security service 403, Fusion CRM service 404, Java service 405, and database service 406. Tenant's B service instances can include a security service 413, Java service 414, and database service 415. Tenant C's service instances can include a security service 423, Fusion CRM service 424, Social Network service 425, and database service 426

Figure 12:
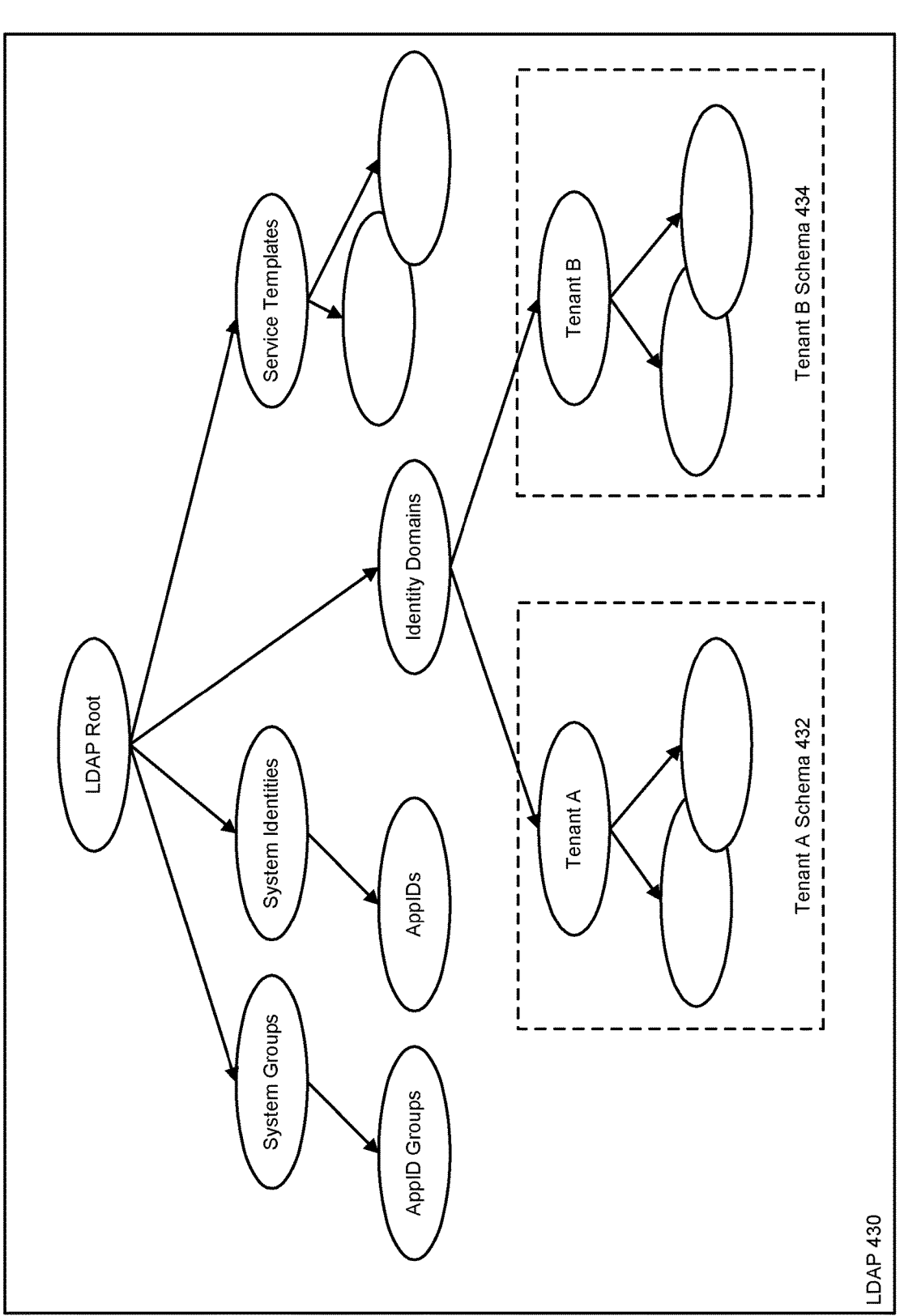
FIG. 12 illustrates the use of LDAP to support multiple tenants, in accordance with an embodiment.

FIG. 12 illustrates the use of LDAP to support multiple tenants, in accordance with an embodiment. As shown in FIG. 12, a shared LDAP 430 can be used to allow a tenant A's schema 432, to coexist with a tenant B's schema 434. As described above, each tenant obtains a separate slice of the shared identity management system, with each particular tenant having a view into its own slice, as determined by its schema. This enables several tenants to be securely hosted within the cloud environment, on a system using a common underlying infrastructure, while separated from other tenant environments and applications.

Figure 13:
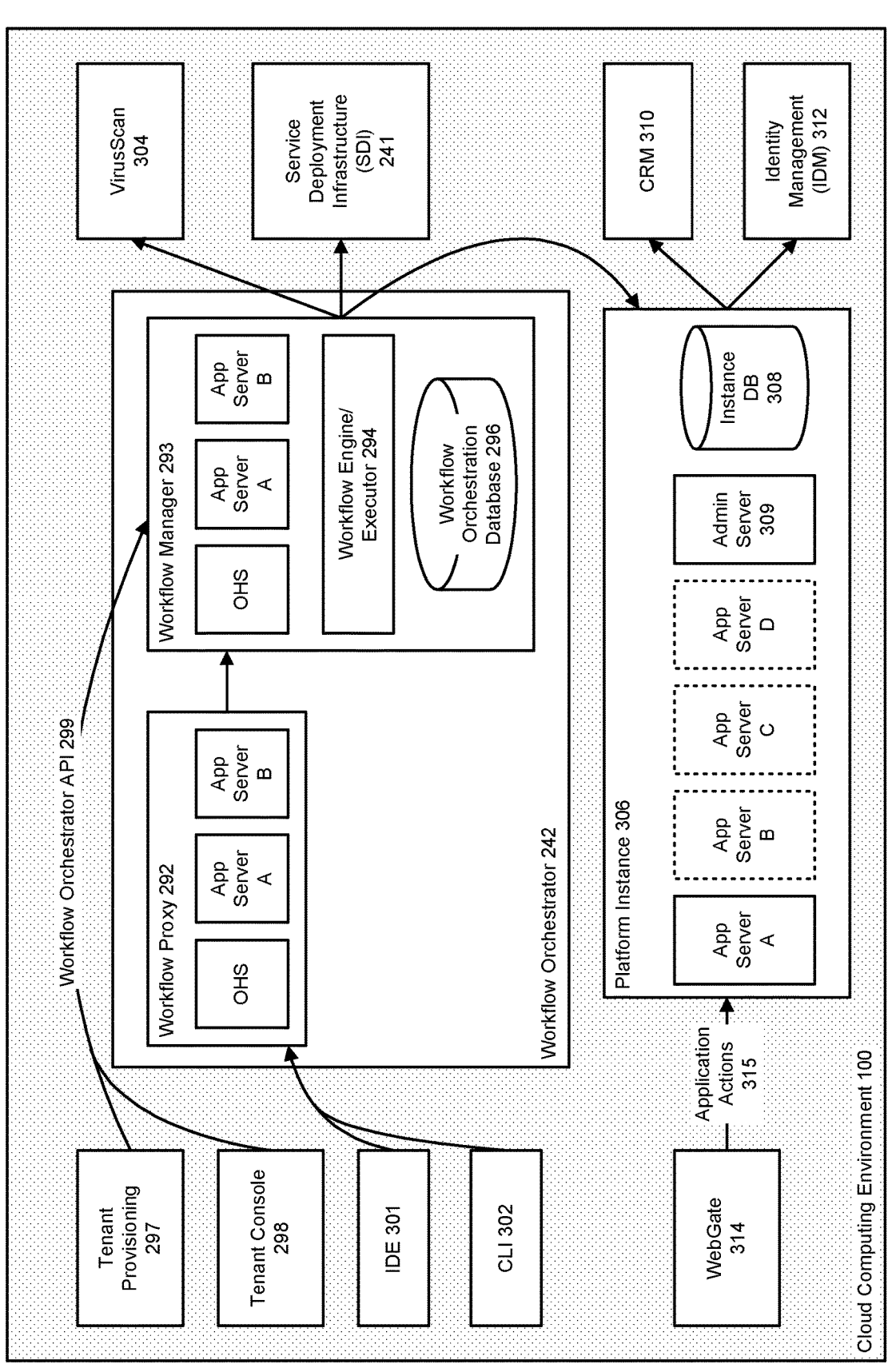
FIG. 13 illustrates a workflow orchestrator, in accordance with an embodiment.

Although the above description describes how JCS infrastructure can be used in combination with other components, such as TAS, SDI, and OVAB, to create Java service platform instances; in accordance with other embodiments, the JCS infrastructure can be similarly used with other service components within the cloud environment, or with other types of shared enablement and managing infrastructure, to create Java service, or other platform instances.
Workflow Orchestrator FIG. 13 illustrates a workflow orchestrator, in accordance with an embodiment. As described above, a workflow orchestrator can be used to orchestrate operations, e.g., by receiving a request from a tenant automation system, and coordinating the provisioning and deployment of virtual assemblies or applications.

As shown in FIG. 13, in accordance with an embodiment, the workflow orchestrator 242 can include a workflow proxy component 292, and a workflow manager component 293, and can receive requests from tenant provisioning or other components or systems, to perform provisioning, modify a service in some way (e.g., associating another service with it) or other cloud operations, and to execute workflow jobs asynchronously.

In accordance with an embodiment, each job is recognized by the workflow orchestrator as an asynchronous process that executes one or more actions associated with a particular PaaS workflow. Each action is considered an atomic unit of work that is designed to create and manage resources within a public cloud runtime environment. Actions can be grouped into operations, which correspond to various functional capabilities of the workflow orchestrator, such as creating a service instance, or deploying an application. A job then executes the actions for a single operation, as part of a workflow.

In accordance with an embodiment, actions can be implemented as Java classes that extend a workflow orchestrator service provider interface (SPI). The classes implemented by the workflow orchestrator provide access to the runtime information and the services that are necessary to implement the actions.

In accordance with an embodiment, a service platform is a description of the operations and actions that are supported by a particular class of service. For example, a WebLogic service platform defines those operations and actions that are required to implement all of the workflow orchestrator service and application lifecycle operations within the context of a WebLogic environment. Each other/different type of service platform can be associated with its own/different types of actions, which can be configured via an XML document stored in the workflow orchestrator's shared configuration.

In accordance with an embodiment, the workflow manager is the entry point into the workflow orchestrator, providing secure access to PaaS operations via a workflow orchestrator application program interface (API), which in accordance with an embodiment can be provided as a REST API. Internally, the workflow manager controls job execution using a workflow engine/executor 294, and tracks jobs and other system state in a workflow orchestration database 296. The workflow orchestration database can also include information required to track domain entities, such as platform instances, deployment plans, applications, Weblogic domains, and alerts.

Each job is a sequence of actions specific to a particular PaaS workflow, e.g., the provisioning of a Java cloud service platform instance. Actions are typically performed in a sequential order, with failure in any step resulting in failure of the overall job. Depending on the service platform configuration, some workflow actions may delegate actions to external systems relevant to the workflow, such as an enterprise manager, or a virus scanning service.

In accordance with an embodiment, within the context of a public cloud, the workflow manager can be directly accessed 299 via its workflow orchestrator API by certain clients, such as a tenant provisioning 297, or tenant console 298 component, to drive provisioning and deployment operations respectively.

Other clients, for example JDeveloper or NetBeans IDE 301, or other command line interfaces (CLI) 302, can also be used to access lifecycle operations on the platform instances. However, for additional security, these clients will typically access the workflow manager via the workflow proxy. For example, in accordance with an embodiment, the workflow manager (including its OHS and application server instances) can be hosted in a WebLogic cluster running inside the firewall, while the workflow proxy (including its OHS and application server instances) can be provided as a public access point outside the firewall. Requests received by the proxy are then forwarded to the workflow manager.

In accordance with an embodiment, depending on the service platform configuration, the workflow orchestrator can utilize additional components or systems to carry out a workflow. For example, in the context of a Java cloud service, such additional components or systems can include:

Virus Scan 304: before a user's application is deployed to the cloud environment, their application can be scanned for viruses using a Virus Scan component.

Service Deployment Infrastructure (SDI): an SDI component can provide access to assembly builder products, such as OVAB and OVM, for use in deploying or undeploying assemblies, or scaling appliances.

Customer Relationship Management (CRM) 310: when requested the workflow can associate a service, such as a Java cloud service, with a CRM instance.

Identity Management (IDM) 312: the workflow orchestrator can use identity management components, e.g., a service database containing information about tenants and their service subscriptions, to properly configure certain platform instances.

The above example is provided for purposes of illustration. In accordance with other embodiments and other workflows, additional or other components or systems can also be used to carry out a particular workflow.

As further shown in FIG. 13, in accordance with an embodiment, the workflow orchestrator can be used to coordinate provisioning of a platform instance 306.

For example, in the context of a Java cloud service, the resultant platform instance will contain all of those resources that are required to provide a WebLogic or other application server service, for a given tenant according to their order, including, e.g., an instance database 308, administration server 309, and one or more application servers.

Once instantiated and deployed to a cloud environment, a tenant user and/or their applications, can then access their platform instance 315. Different types of access can be provided. In accordance with an embodiment, administration (e.g., monitoring, deploying/undeploying applications) can be performed by tenants through the proxy. Applications that tenants have deployed on a provisioned instance are owned by the tenants and could be anything for different purposes, e.g., providing custom access to their CRM instance; this can be provided through a service specific URL by tenant's customers, using, e.g., WebGate 314 for authentication and authorization.

Virtual Assembly Builder

Figure 14:
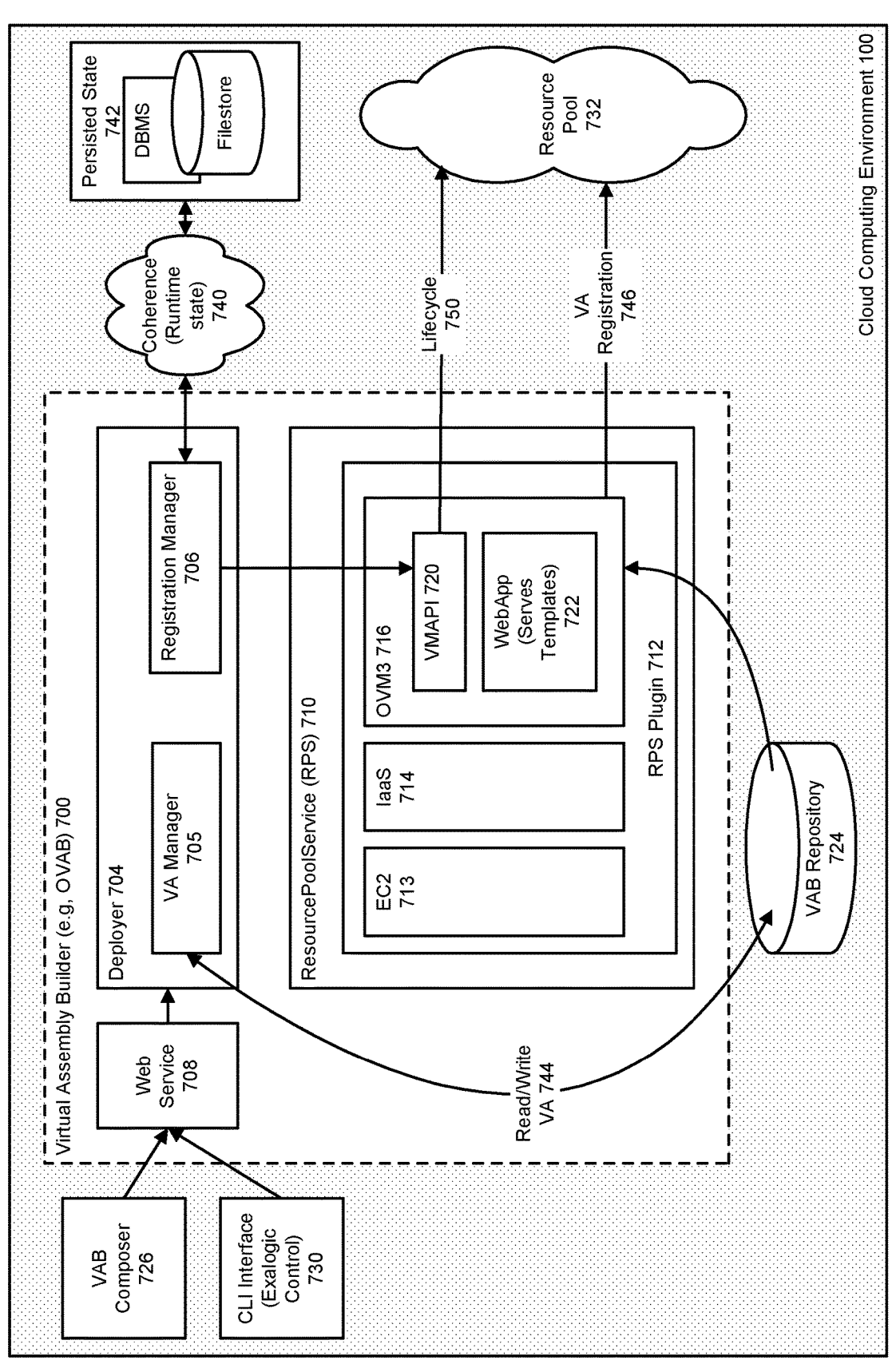
FIG. 14 illustrates a virtual assembly builder for use with a cloud computing environment, in accordance with an embodiment.

FIG. 14 illustrates a virtual assembly builder for use with a cloud computing environment, in accordance with an embodiment. As shown in FIG. 14, in accordance with an embodiment, a virtual assembly builder component 700 can be provide as an application (e.g., a J2EE application) which maintains a repository 724 of virtual assembly archives (e.g., as Oracle Virtual Assembly, OVA format archives). In accordance with an embodiment, the virtual assemblies can be created using a composer 726, command line interface 730, editor or other product, such as OVAB Studio. The virtual assembly builder (in accordance with an embodiment, Oracle Virtual Assembly Builder, OVAB) provides operations for registering virtual assemblies with cloud components, and/or managing deployment instances defined by an assembly archive.

In accordance with an embodiment, virtual assemblies can include a metadata and one or more virtual machine templates that can be used to instantiate an instance of the assembly. The virtual assembly builder includes a deployer component 704, which can be accessed, e.g., by way of a web service or other interface 708, and which enables operations for uploading 744 virtual assemblies to the repository, registering virtual assemblies with cloud components, and/or managing deployment instances defined by an assembly.

In accordance with an embodiment, the deployer can be deployed as an instance in application server administration server, or as a set of instances in a collection of managed servers. Multi-instance embodiments can utilize shared database or disk functionality 742 for storage of the deployer's runtime and configuration state 740, as provided by, e.g., Coherence, or a similar component. In accordance with an embodiment, the deployer and its interface can provide support for a variety of logical operations, such as creating an assembly instance, or creating or updating a target.

In accordance with an embodiment, the virtual assembly builder deployer can include a virtual assembly manager 705, and a registration manager 706. The virtual assembly builder can also include a resource pool service (RPS), 710 and one or more resource pool service plugins 712, such as OVM3 716, IaaS 714 and/or EC2 713 plugins. In accordance with an embodiment, an OVM3 plugin can support the use of VMAPI 720, and templates 722, to enable registration of assemblies 746 with a resource pool 732, and lifecycle management 750.

Some virtualization system allow tags to be associated with artifacts such as templates or VM instances, which can then be queried by tools and cloud component interacting with the virtual assembly builder, to locate artifacts and/or to find relationships between artifacts, e.g., to find artifacts that are associate with a particular deployment.

As part of the virtual assembly builder lifecycle, virtual assemblies can be uploaded to the deployer's repository, using e.g., an UploadAssemblyArchive operation. The uploaded virtual assembly can then be registered with one or more targets, e.g. using a RegisterAssemblyArchive operation. Registration includes uploading the virtual assembly to the repository, and registering its templates with a resource pool within the virtual assembly builder environment. After a virtual assembly has been registered with a target, one or more deployments can be created for that registration using, e.g., a CreateAssemblyInstance operation. In accordance with an embodiment, a deployment can be considered a context that is used to manage the lifecycle of virtual machine (VM) instances for an assembly, as defined by its, e.g., OVA configuration.

In accordance with an embodiment, once a deployment has been created for a virtual assembly, a deployment operation can be initiated. During deployment, the initial instances for the assembly are created and started. As this is being performed, the deployer uses a rehydration logic which can be, e.g. embedded in the initialization scripts of those instances, and which configures various aspects of the assembly, such as the operating system, networks, or disk volumes. In accordance with an embodiment, the deployer also configures the virtual machine application stack for use within the environment; for example, information can be provided for configuring connections between instances that are created when the application starts up.

Once a deployment has been deployed, additional lifecycle operations can be applied to the running system, such as a Scale operation which can be used to increase or decrease the number of running instances for an appliance within an assembly. Operations can also be supported to, e.g. start or stop all instances of a deployment, or for other functionalities.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing services in a cloud computing environment, comprising:

one or more computers, including a processor and a cloud computing environment executing thereon that operates to provide service instances within the cloud computing environment, wherein each of the service instances provide an application server for execution of software applications;

wherein the cloud computing environment comprises a workflow manager that performs actions defined by workflow operations, to provision tenant environments with one or more service instances and create or personalize the service instances to include requested services as part of the tenant environments;

wherein the cloud computing environment comprises a shared identity manager that supports multiple tenants including associating each tenant with a unique name space schema operating as a tenant schema when subscribing to a requested service, so that each tenant's identity domain is isolated from others of a plurality of tenants;

wherein, in response to an order to create or personalize a service instance to be associated with a tenant environment, the system orchestrates provisioning and deployment of the service instance to the cloud computing environment, within an identity domain associated with the tenant, and associates a database service with the service instance, including that:

the service instance is associated with a schema that is unique to the tenant environment and the service instance and enables the identity manager to manage association of a database service with the service instance, so that the service instance and data base service is isolated from other services instances and database services that are associated with others of the plurality of tenants; and a service platform defines operations and actions that are required to implement workflow orchestrator service and application lifecycle operations within the context of a tenant environment wherein each type of service platform associated with its own types of actions, including that:

for a first tenant, a first tenant environment and its service instances are associated with a first database service, and a first identity domain namespace and a first tenant schema, by the shared identity manager, wherein the first tenant schema is used in deploying applications for the first tenant to its service instances; and for a second tenant, a second tenant environment and its service instances are associated with a second database service, and a second identity domain namespace and a second tenant schema, by the shared identity manager, wherein the second tenant schema is used in deploying applications for the second tenant to its service instances; and for each of the tenant environment service instances, an interface is associated with the service instance as deployed, that enables deployment of one or more software applications to the service instance for execution within its associated identity domain.

2. The system of claim 1, wherein each of the service instances is an instance of a Java cloud service that includes at least one application server instance for running Java-based applications.

3. The system of claim 1, wherein creating and/or updating of the instance of the cloud service includes one or more of creation and/or personalization of a virtual assembly provided by a virtual assembly builder component.

4. The system of claim 1, wherein a workflow orchestrator associates additional resources and services with particular service instances, for use by tenant applications deployed to the particular service instances.

5. The system of claim 1, wherein each identity domain represents a slice of a shared identity domain, provisioned for a particular tenant, including that each tenant obtains a separate slice of the shared identity domain, as determined by its associated name space schema.

6. The system of claim 1, wherein for each of the first tenant and second tenant, its unique name space schema operating as a tenant schema operates as an identity domain that provides a persistent namespace for use with a tenant's security artifacts.

7. The system of claim 1, wherein each of the services instances provisioned and deployed to the cloud computing environment include a security service and one or more additional services, including:

for the first tenant, the first tenant environment and its service instances are associated with the first identity domain namespace and a first security service, for use used in deploying applications for the first tenant to is service instances; and for the second tenant, the second tenant environment and its service instances are associated with the second identity domain namespace and a second security service, for use in deploying applications for the second tenant to its service instances.

8. The system of claim 1, further comprising a tenant automation solution component that manages processes associated with a customer order, determines whether the order should proceed to provisioning, and interacts with a service deployment infrastructure for service instance creation, to create new services.

9. A method for providing services in a cloud computing environment, comprising:

providing, within a cloud computing environment, a cloud service that operates to provide service instances within the cloud computing environment, wherein each of the service instances provide an application server for execution of software applications;

wherein the cloud computing environment comprises a workflow manager that performs actions defined by workflow operations, to provision tenant environments with one or more service instances and create or personalize the service instances to include requested services as part of tenant environments;

wherein the cloud computing environment comprises a shared identity manager that supports multiple tenants including associating a tenant with a unique name space schema operating as a tenant schema when subscribing to a requested service, so that each tenant's identity domain is isolated from others of a plurality of tenants;

in response to an order to create a service instance to be associated with a tenant environment, orchestrating provisioning and deployment of the service instance to the cloud computing environment, within an identity domain associated with the tenant, and associating a database service with the service instance, including that:

the service instance is associated with a schema that is unique to the tenant environment and the service instance and enables the identity manager to manage association of a database service with the service instance, so that the service instance and data base service is isolated from other services instances and database services that are associated with others of the plurality of tenants; and a service platform defines operations and actions that are required to implement workflow orchestrator service and application lifecycle operations within the context of a tenant environment wherein each type of service platform associated with its own types of actions, including that:

for a first tenant, a first tenant environment and its service instances are associated with a first database service, and a first identity domain namespace and a first tenant schema, by the shared identity manager, wherein the first tenant schema is used in deploying applications for the first tenant to its service instances; and for a second tenant, a second tenant environment and its service instances are associated with a second database service, and a second identity domain namespace and a second tenant schema, by the shared identity manager, wherein the second tenant schema is used in deploying applications for the second tenant to its service instances; and for each of the tenant environment service instances, an interface is associated with the service instance as deployed, that enables deployment of one or more software applications to the service instance for execution within its associated identity domain.

10. The method of claim 9, wherein each of the service instances is an instance of a Java cloud service that includes at least one application server instance for running Java-based applications.

11. The method of claim 9, wherein creating and/or updating of the instance of the cloud service includes one or more of creation and/or personalization of a virtual assembly provided by a virtual assembly builder component.

12. The method of claim 9, wherein a workflow orchestrator associates additional resources and services with particular service instances, for use by tenant applications deployed to the particular service instances.

13. The method of claim 9, wherein each identity domain represents a slice of a shared identity domain, provisioned for a particular tenant, including that each tenant obtains a separate slice of the shared identity domain, as determined by its associated name space schema.

14. The method of claim 9, wherein for each of the first tenant and second tenant, its unique name space schema operating as a tenant schema operates as an identity domain that provides a persistent namespace for use with a tenant's security artifacts.

15. The method of claim 9, wherein each of the services instances provisioned and deployed to the cloud computing environment include a security service and one or more additional services, including:

for the first tenant, the first tenant environment and its service instances are associated with the first identity domain namespace and a first security service, for use used in deploying applications for the first tenant to its service instances; and for the second tenant, the second tenant environment and its service instances are associated with the second identity domain namespace and a second security service, for use in deploying applications for the second tenant to its service instances.

16. The method of claim 9, further comprising providing a tenant automation solution component that manages processes associated with a customer order, determines whether the order should proceed to provisioning, and interacts with a service deployment infrastructure for service instance creation, to create new services.

17. A non-transitory computer readable storage medium, including instructions stored thereon which when read and executed by one or more computers cause the one or more computers to perform a method comprising:

providing, within a cloud computing environment, a cloud service that operates to provide service instances within the cloud computing environment, wherein each of the service instances provide an application server for execution of software applications;

wherein the cloud computing environment comprises a workflow manager that performs actions defined by workflow operations, to provision tenant environments with one or more service instances and create or personalize the service instances to include requested services as part of tenant environments;

wherein the cloud computing environment comprises a shared identity manager that supports multiple tenants including associating a tenant with a unique name space schema operating as a tenant schema when subscribing to a requested service, so that each tenant's identity domain is isolated from others of a plurality of tenants;

in response to an order to create a service instance to be associated with a tenant environment, orchestrating provisioning and deployment of the service instance to the cloud computing environment, within an identity domain associated with the tenant, and associating a database service with the service instance, including that:

the service instance is associated with a schema that is unique to the tenant environment and the service instance and enables the identity manager to manage association of a database service with the service instance, so that the service instance and data base service is isolated from other services instances and database services that are associated with others of the plurality of tenants; and a service platform defines operations and actions that are required to implement workflow orchestrator service and application lifecycle operations within the context of a tenant environment wherein each type of service platform associated with its own types of actions, including that:

for a first tenant, a first tenant environment and its service instances are associated with a first database service, and a first identity domain namespace and a first tenant schema, by the shared identity manager, wherein the first tenant schema is used in deploying applications for the first tenant to its service instances; and for a second tenant, a second tenant environment and its service instances are associated with a second database service, and a second identity domain namespace and a second tenant schema, by the shared identity manager, wherein the second tenant schema is used in deploying applications for the second tenant to its service instances; and for each of the tenant environment service instances, an interface is associated with the service instance as deployed, that enables deployment of one or more software applications to the service instance for execution within its associated identity domain.

18. The non-transitory computer readable storage medium of claim 17, wherein each of the service instances is an instance of a Java cloud service that includes at least one application server instance for running Java-based applications.

19. The non-transitory computer readable storage medium of claim 17, wherein creating and/or updating of the instance of the cloud service includes one or more of creation and/or personalization of a virtual assembly provided by a virtual assembly builder component.

20. The non-transitory computer readable storage medium of claim 17, wherein a workflow orchestrator associates additional resources and services with particular service instances, for use by tenant applications deployed to the particular service instances.

* * * * *